United States Patent

Suzuki et al.

[11] Patent Number: 5,926,287
[45] Date of Patent: *Jul. 20, 1999

[54] IMAGING DEVICE

[75] Inventors: Masahiro Suzuki, Chiba; Tadashi Ohta, Yokohama; Koichiro Kawamura, Ichihara, all of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/516,110

[22] Filed: Aug. 17, 1995

Related U.S. Application Data

[30] Foreign Application Priority Data

Feb. 14, 1995 [JP] Japan ...................... 7-025592

[51] Int. Cl.⁶ ............................ H04N 1/04; H04N 5/235; H04N 5/238
[52] U.S. Cl. .............................. 358/483; 396/63; 396/65; 396/155; 348/362; 348/363; 348/364
[58] Field of Search ..................... 358/483, 464, 358/475; 396/234, 242, 287, 106, 63, 64, 228, 65, 66, 150, 223, 155, 243, 299, 543; 250/201.2, 231.8, 201.8, 205; 348/277, 364, 229, 340, 362, 363; 354/410, 415, 432

[56] References Cited

U.S. PATENT DOCUMENTS

| | | | |
|---|---|---|---|
| 4,306,787 | 12/1981 | Fukuhara et al. | 354/410 |
| 4,825,293 | 4/1989 | Kobayashi et al. | 348/229 |
| 4,896,182 | 1/1990 | Akiyama et al. | 354/481 |
| 4,984,007 | 1/1991 | Takagi | 354/432 |
| 5,012,268 | 4/1991 | Hirai | 354/410 |
| 5,019,911 | 5/1991 | Okino et al. | 348/364 |
| 5,499,075 | 3/1996 | Sato et al. | 354/415 |
| 5,541,706 | 7/1996 | Goto | 354/432 |
| 5,559,555 | 9/1996 | Shimizu et al. | 348/364 |
| 5,572,011 | 11/1996 | Goto | 250/201.2 |
| 5,587,766 | 12/1996 | Kawamura et al. | 348/340 |
| 5,592,223 | 1/1997 | Takamura et al. | 348/340 |
| 5,602,412 | 2/1997 | Suzuki et al. | 348/277 |
| 5,602,615 | 2/1997 | Muramatsu et al. | 396/228 |

FOREIGN PATENT DOCUMENTS

A-6-178198  6/1994  Japan .
A-6-311422  11/1994  Japan .

*Primary Examiner*—Kim Yen Vu
*Assistant Examiner*—Mark Wallerson
*Attorney, Agent, or Firm*—Oliff & Berridge, PLC

[57] ABSTRACT

An imaging device according to the present invention has: a photometric circuit that detects a brightness of a photographic subject based on a light flux from the photographic subject that passes through a photographic lens; an exposure calculation circuit that calculates an aperture value and a shutter speed based on the detected brightness of the photographic subject; an imaging element that converts the light flux from the photographic subject received on each photo-electric element to an electric signal and outputs the electric signal, the imaging element having a plurality of the photo-electric elements and a micro-lens in which each of micro-lens elements is arranged facing to each of the photo-electric elements in order to converge the light flux from the photographic subject to a light receiving surface of each of the photo-electric elements; and a correction circuit that corrects the aperture value calculated by the exposure calculation circuit so that a signal level of the electric signal of the light flux does not change among photographic subjects each having a same brightness respectively.

37 Claims, 20 Drawing Sheets

IMAGING DEVICE

BACKGROUND OF THE INVENTION

1. Field of the Invention

The present invention relates to an imaging device that forms an image of an photographic subject by using a solid-state imaging element such as a CCD or the like, and particularly relates to an imaging device that is provided with a micro-lens on a light receiving surface of the solid-state imaging element.

2. Description of the Prior Art

A solid-state imaging element such as a CCD or the like (hereinafter termed an imaging element) is becoming more miniaturized in recent years and also the number of picture elements of the imaging element is increasing. As a result, an area of a light receiving section of each photo-electric element must be small. If the area of the light receiving section becomes small, the sensitivity drops. An imaging element is known in which a micro-lens is formed as a unitary body in front of each light receiving section as shown in FIG. 20 and a light flux from a photographic subject is converged to the light receiving section so that reduction of the sensitivity is compensated.

However, if the micro-lens that has a certain curvature is attached, the sensitivity of the imaging element varies according to a value of an aperture that is positioned in front of the imaging element, that is on the photographic subject side, or a distance between an exit pupil position of a photographic lens and the imaging element. For example, since the light flux from the photographic subject comes into the micro-lens almost in parallel if the aperture value is great, most of the light flux is received on the light receiving section and the sensitivity becomes good. In the same way, since the light flux from the photographic subject comes into the micro-lens almost in parallel if the distance between the exit pupil position and the imaging element is long, the sensitivity becomes good. On the other hand, if the aperture value is small or the distance between the exit pupil position and the imaging element is short, a light flux from the photographic subject that obliquely comes into the micro lens increases. Accordingly, the light flux is refracted greatly by the micro-lens according to the incident angle of the light flux and some of the light flux is not received by the light receiving section. As a result, the sensitivity drops.

An imaging device is known in which dropping of the sensitivity is compensated by electrically amplifying image data outputted from the imaging element with an amplification factor according to the aperture value to solve the above-mentioned problem (Japanese Laid-Open Patent Application No. 6-178198). However, since the output of the imaging element includes noise, if the amplification factor is set to a great value to compensate the drop in sensitivity, the noise is also amplified and the picture quality becomes low. The low picture quality like this is not a substantial problem for a video camera or the like by which a dynamic image is recorded and reproduced. But the low picture quality is a substantial problem for an electronic still camera or the like which handles a still image, because the low picture quality is conspicuous even if the picture quality is not so low.

Japanese Laid-Open Patent Application No. 6-311422 discloses an imaging device in which a shutter speed is modified according to the aperture value or the distance between the exit pupil position and the imaging element. However, if the shutter speed is different from one that a photographer recognizes, the photographer feels strange and a camera vibration by hand likely occurs. For example, if a photography is performed with a lower shutter speed than $\frac{1}{60}$ sec and an open aperture, the sensitivity of the imaging element drops to about 50%. The shutter speed must be set low as the photographer feels the low shutter speed in order to compensate this dropping of the sensitivity. As a result, the photographer feels strange.

SUMMARY OF THE INVENTION

The object of the present invention is to provide an imaging device that can accurately compensate dropping of the sensitivity of an imaging element that is caused from a change of an aperture value or an exit pupil position.

In order to attain this object, an imaging device according to the present invention comprises: a photometric means for detecting brightness of a photographic subject based on light flux from the photographic subject that passes through a photographic lens; an exposure calculation means for calculating an aperture value and a shutter speed based on the detected brightness of the photographic subject; an imaging means for converting the light flux from the photographic subject received on each photo-electric element to an electric signal and outputting the electric signal, the imaging means having a plurality of the photo-electric elements and a micro-lens in which each of micro-lens elements is arranged facing to each of the photo-electric elements in order to converge the light flux from the photographic subject to a light receiving surface of each of the photo-electric elements; and a correction means for correcting the aperture value calculated by the exposure calculation means so that a signal level of the electric signal of the light flux does not change among photographic subjects each having the same brightness.

DESCRIPTION OF THE PREFERRED EMBODIMENTS

A first embodiment through a thirteenth embodiment of an imaging device according to the present invention will be explained with reference to FIGS. 1 through 18. In the first embodiment through the thirteen embodiment, cases that the imaging device is installed in an electronic still camera will be explained.

First Embodiment

Figure 1:
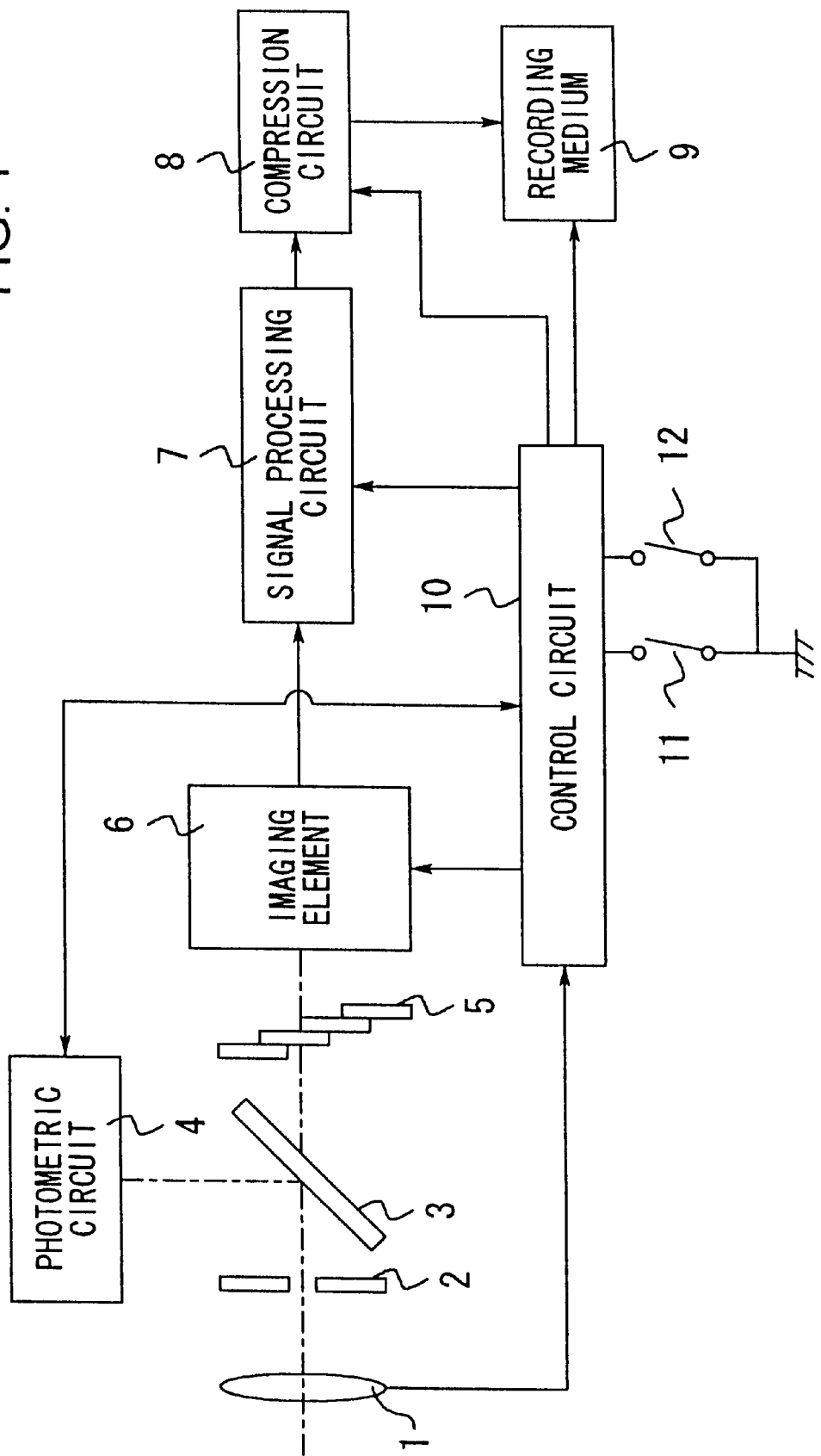
FIG. 1 is a block diagram of a first embodiment of an imaging device according to the present invention.

FIG. 1 is a block diagram showing an outline of a construction of an imaging device of a first embodiment. In FIG. 1, the reference numeral 1 denotes a photographic lens, and a light flux from a photographic subject that passes through the photographic lens 1 is lead to an aperture 2. The reference numeral 3 denotes a quick return mirror (hereinafter termed a mirror) that transmits and reflects the light flux from the photographic subject that passed through the aperture 2. A light flux that is reflected by the mirror 3 is inputted to a photometric circuit 4, and the brightness of the photographic subject is detected. On the other hand, a flux that is transmitted by the mirror 3 is lead to a shutter 5. The reference numeral 6 denotes an imaging element that receives the light flux from the photographic subject according to opening and closing of the shutter 5, stores electric charges according to an amount of receiving light, and outputs the stored electric charges as image data. For example, the imaging element 6 is composed of a CCD. The imaging element 6 has many photo-electric elements inside and a micro-lens element is arranged in front of each photo-electric element to converge the light flux from the photographic subject.

The reference numeral 7 denotes a signal processing circuit for image data outputted from the imaging element 6, and the signal processing circuit 7 performs a compensation processing such as white balance compensation, γ compensation, outlines compensation or the like. The reference numeral 8 denotes a compression circuit that compresses the image data on which the compensation processing was performed, and the compressed data is stored into a recording medium 9 such as a memory card or the like. The reference numeral 10 denotes a control circuit that controls a whole apparatus such as setting an aperture value of the aperture 2, opening and closing of the shutter 5, or the like. The control circuit 10 is connected with a halfway depressing switch 11 that is turned on when a release button is depressed halfway down and an all-the-way depressing switch 12 that is turned on when the release button is depressed all the way.

Figure 2:
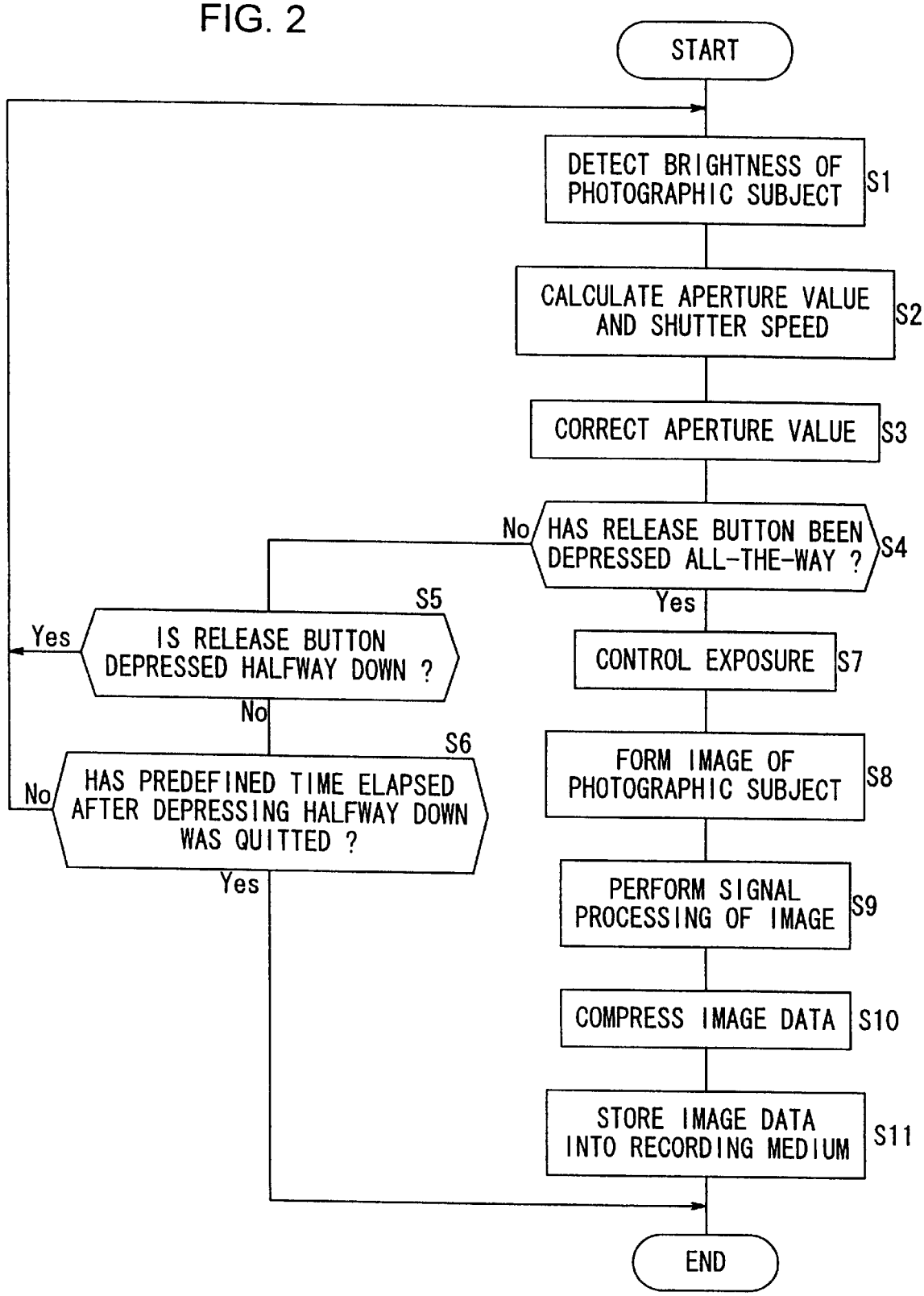
FIG. 2 is a flow chart showing an operation of a control circuit of a first embodiment.

FIG. 2 is a flow chart showing an operation of the control circuit 10 of the first embodiment. The control circuit 10 starts the operation shown in FIG. 2 when the release button has been depressed halfway down. In the step S1 of FIG. 2, the control circuit sends a signal to the photometric circuit 4 to starts detecting the brightness of the photographic subject, and reads in the detected brightness information of the photographic subject. In the step S2, an exposure calculation is performed based on the brightness of the photographic subject, and an aperture value and a shutter speed are calculated. In the step S3, a correction value of the aperture value is calculated based on the aperture value calculated in the step S2. The smaller the aperture value calculated in the step S2 is, the greater dropping of the sensitivity of the imaging element 6 becomes. Therefore, when the calculated aperture value is small, the aperture value is corrected to a still smaller value to compensate dropping of the sensitivity.

Figure 3:
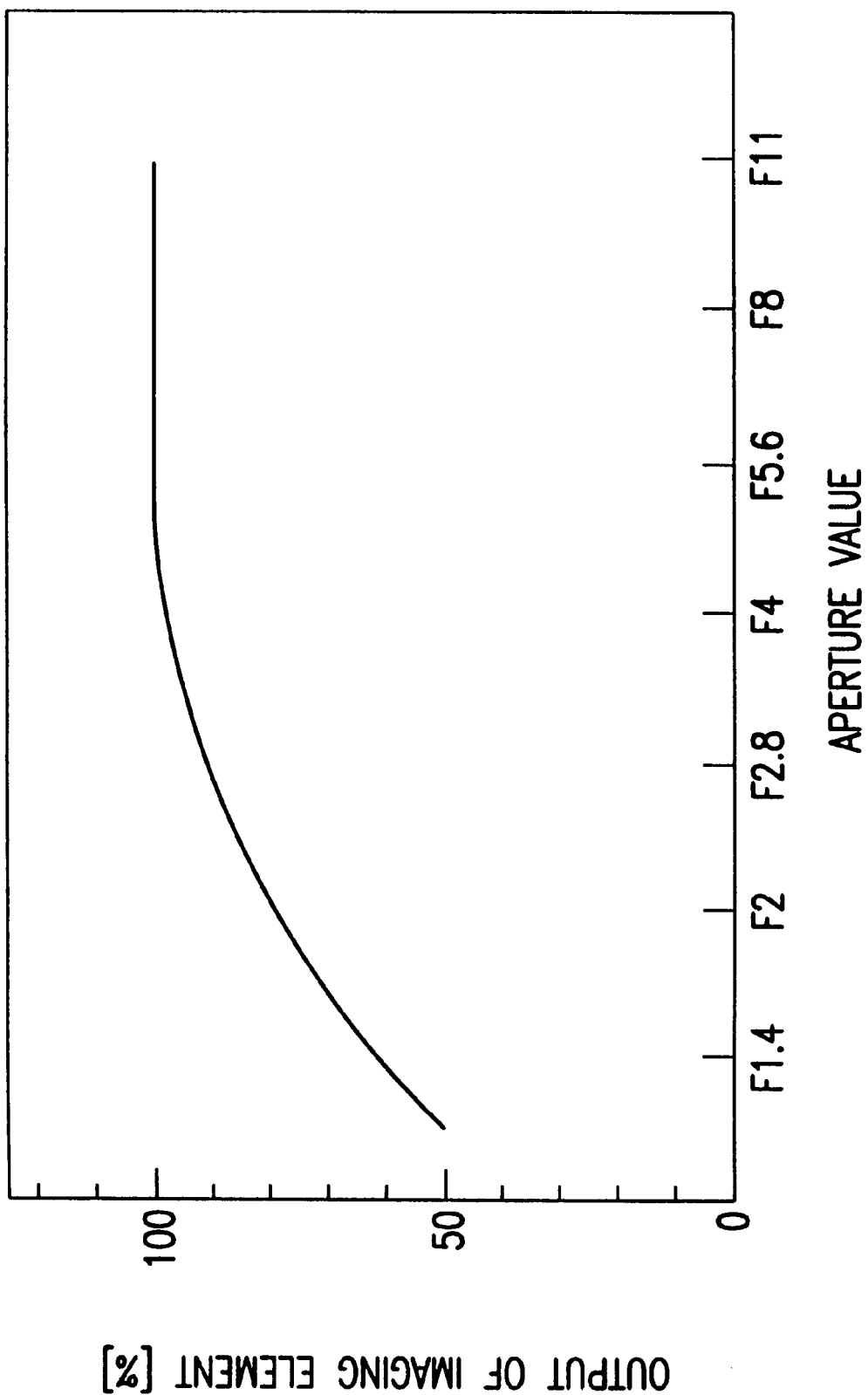
FIG. 3 is a figure showing a relation between an aperture value and an output level of an imaging element.

FIG. 3 is a figure showing a relation between the aperture value and an output level of the imaging element 6. As shown in Figure, when the aperture value is great, the sensitivity of the imaging element 6 does not drop and the output level is maintained in almost 100%. However, the sensitivity drops according as the aperture value becomes small. When the aperture value becomes close to the open aperture, the output level becomes 50% of the peak. Therefore, in the step S3 of FIG. 2, the aperture value is controlled and changed to a smaller value so that the output level of the imaging element 6 becomes close to the value of 100% level.

In the step S4, a decision is made as to whether or not the release button has been depressed all the way. In this case, the decision is made as to whether or not the all-the-way depressing switch 12 is turned on. If the decision is NO, the flow of control goes to the step S5, and a decision is made as to whether or not the release button is depressed halfway down. In this case, the decision is made as to whether or not the halfway depressing switch 11 is depressed halfway down. If the decision is YES, the flow of control returns to the step S1, and if the decision is NO, the flow of control goes to the step S6. In the step S6, a decision is made as to whether or not a predefined time has elapsed after the halfway depressing switch was turned off. If the decision is NO, the flow of control returns to the step S1, and if the decision is YES, the processing is terminated. On the other hand, if the decision is YES in the step S4, the flow of control goes to the step S7, and an exposure is controlled based on the shutter speed calculated in the step S2 and the aperture value corrected in the step S3.

When the processing of the step S7 has been completed, the flow of control goes to the step S8, and forming an image of the photographic subject is performed by opening and closing of the shutter 5. In the step S9, various kinds of compensation processing are performed on the image data outputted from the imaging element 6. In the step S10, the compensated image data is compressed. In the step S11, the compressed data is stored into the recording medium 9.

In this manner, in the first embodiment, since the aperture value is corrected based on the aperture value obtained by the exposure calculation, the sensitivity of the imaging element 6 that changes according to the aperture value can be compensated accurately. And since the sensitivity is compensated by an optical method that is adjusting the aperture value unlike adjusting an electrical amplification factor, an electrical noise does not influence on the correction and a picture quality does not become low.

Second Embodiment

Figure 4:
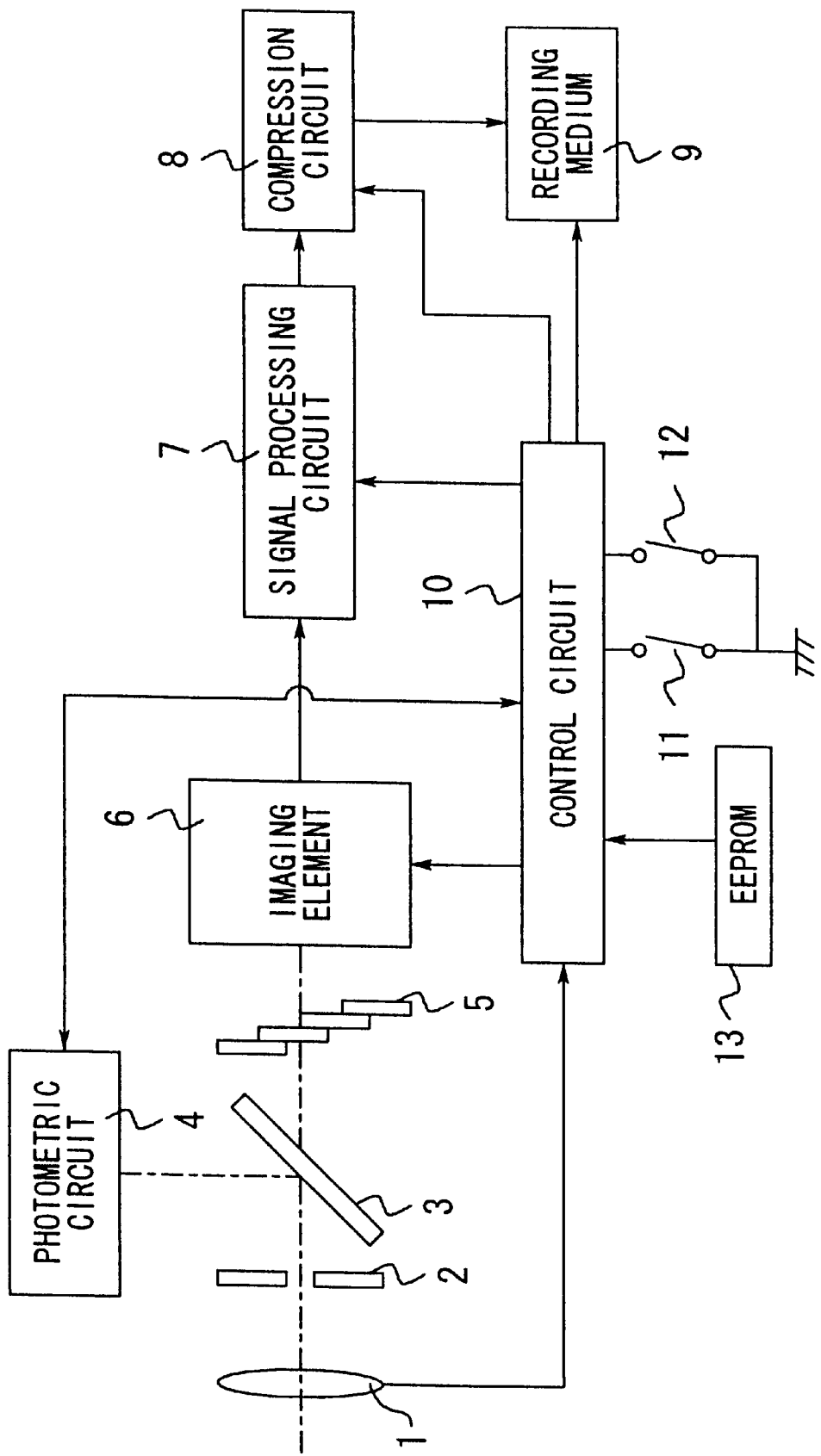
FIG. 4 is a block diagram of a second embodiment of an imaging device according to the present invention.

In a second embodiment, an aperture value is corrected in consideration of manufacturing variations of micro-lenses. FIG. 4 is a block diagram showing an outline of a construction of an imaging device of the second embodiment. The construction of the imaging device of the second embodiment is common to the construction of the first embodiment except adding an EEPROM 13. A plurality of correction patterns to correct the aperture value are stored in the EEPROM 13, and the correction patterns are previously made in consideration of manufacturing variations of micro-lenses corresponding to imaging elements respectively. In other words, each of correction patterns is provided per each of micro-lenses that have different characteristics respectively, and each of the correction patterns includes information that shows how much the aperture value obtained by the exposure calculation should be corrected.

In the second embodiment, a characteristic of a micro-lens is detected and selecting operation that selects a correction pattern corresponding to the micro-lens from the EEPROM 13 (hereinafter termed a selecting operation of correction pattern) is performed before a photography is started after an assembly of an electronic still camera was completed. Concretely speaking, the aperture value is set to a reference value, an image of a uniform brightness surface is formed with the reference aperture value, the output characteristic of the micro-lens is examined by detecting the output level of the imaging element 6, and a correction pattern corresponding to the micro-lens is selected from correction patterns in the EEPROM 13. And when a photography is performed after that, the aperture value is corrected based on the correction pattern selected in the selecting operation of correction pattern.

Figure 5:
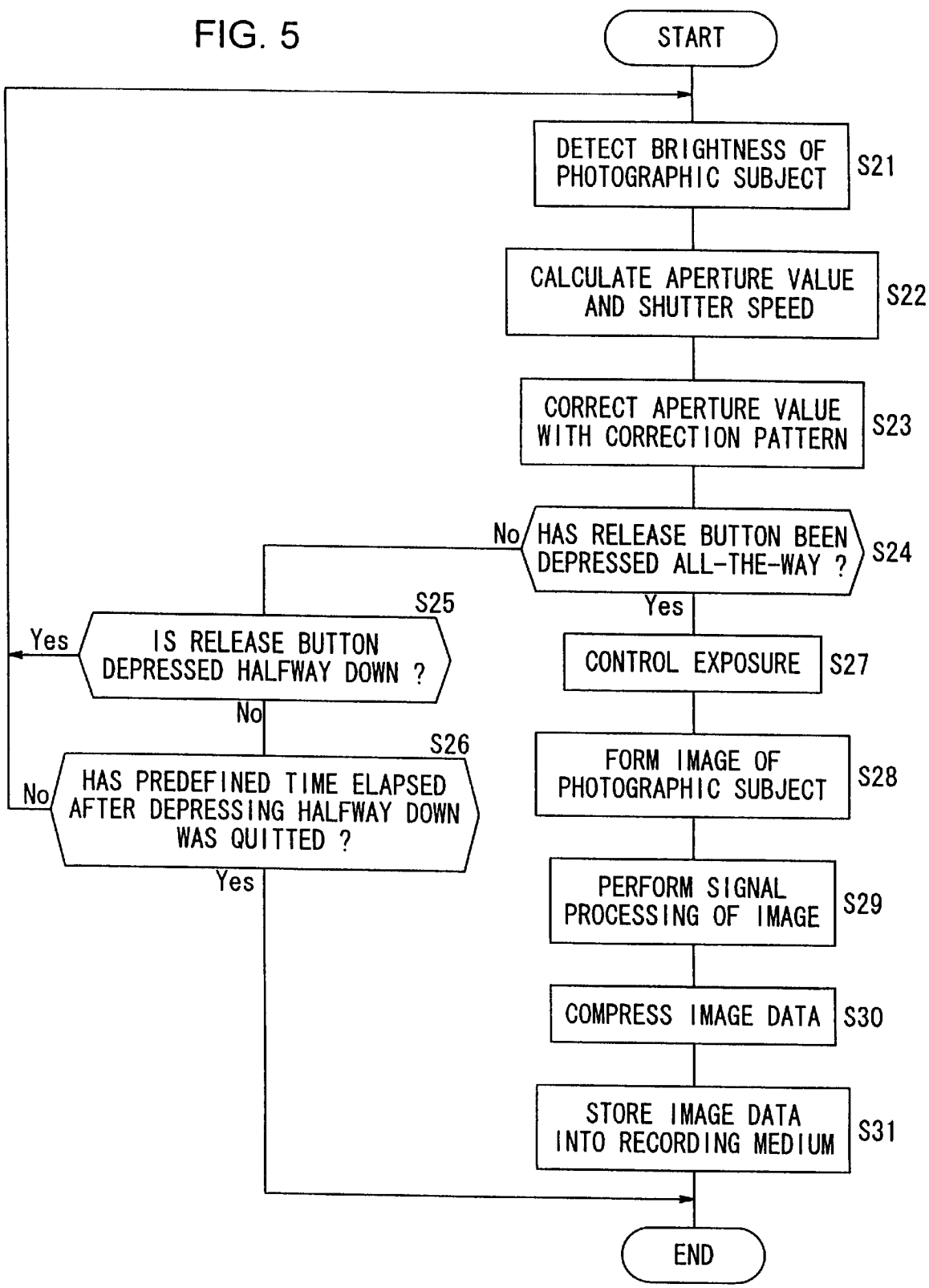
FIG. 5 is a flow chart showing an operation of a control circuit of a second embodiment.

FIG. 5 is a flow chart showing an operation of a control circuit 10 of the second embodiment. In steps of FIG. 5, only the step S23 is different from the first embodiment and will be explained mainly. The flow of control goes to the step S23 after the aperture value has been calculated by the exposure calculation in the step S22. In the step S23, the correction pattern that was selected in the selecting operation of correction pattern is read out from the EEPROM 13, the aperture value is corrected based on the correction pattern, and the aperture 2 is controlled based on the corrected aperture value.

In this manner, in the second embodiment, a plurality of correction patterns, which are corresponding to micro lenses respectively, are previously prepared in consideration of different characteristics of the micro lenses that are caused from manufacturing variations. And the most suitable correction pattern is selected for each imaging element 6 and the calculated aperture value is corrected based on the most suitable correction pattern. As a result, dropping of the sensitivity of the imaging element 6 can be compensated accurately, even if the characteristic of the micro-lens is different from other ones.

Third Embodiment

In a third embodiment, both an aperture value and a shutter speed that are obtained by an exposure calculation are corrected. Since the construction of the third embodiment is common to the construction of the first embodiment, the construction will not be explained.

Figure 6:
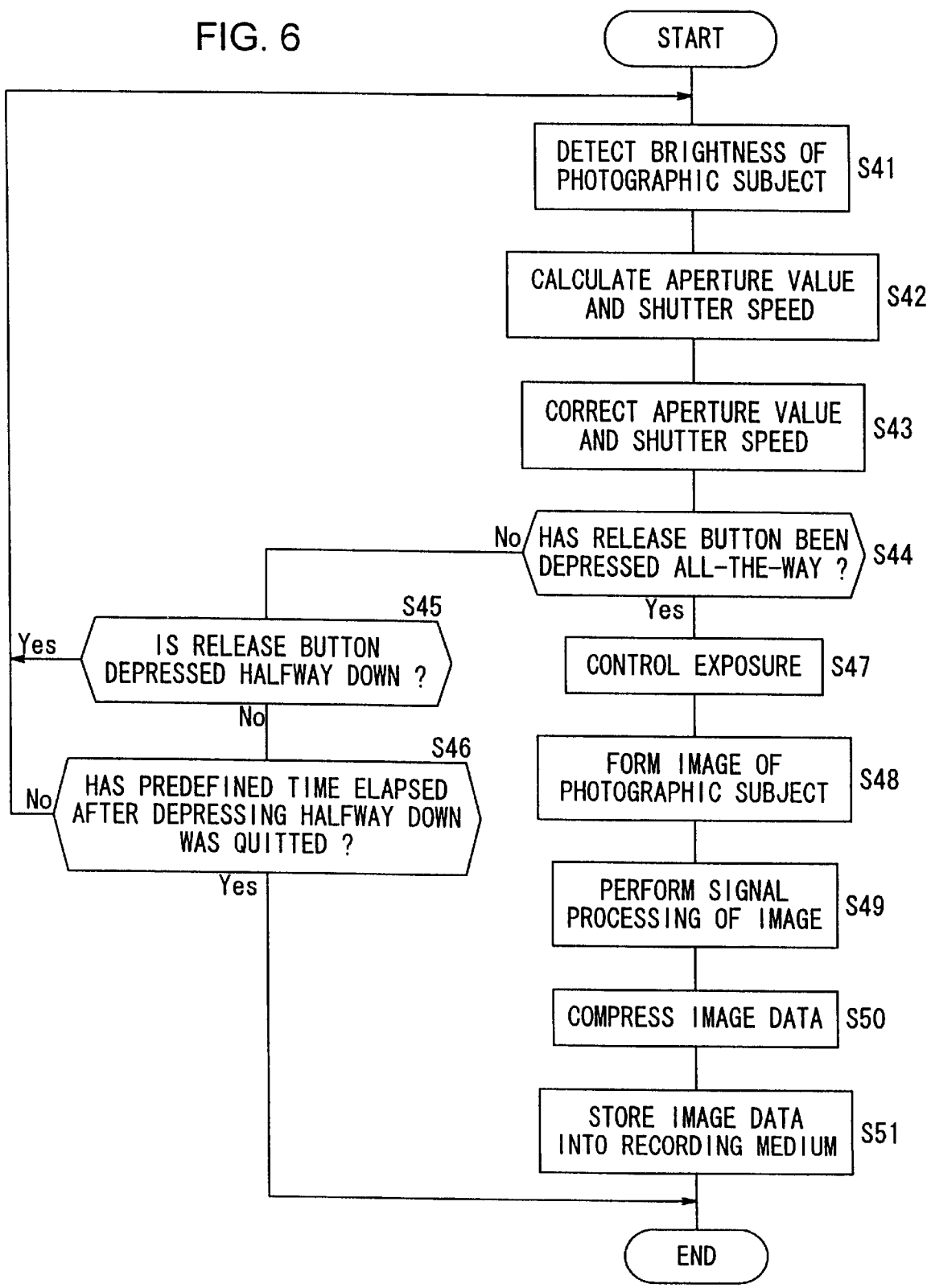
FIG. 6 is a flow chart showing an operation of a control circuit of a third embodiment.

FIG. 6 is a flow chart showing an operation of a control circuit 10 of the third embodiment. In steps of FIG. 6, since the step S43 is only different from the first embodiment, this step will be explained mainly. The flow of control goes to the step S43 after the aperture value has been calculated by the exposure calculation in the step S42, and the aperture value and the shutter speed are corrected so that dropping of the sensitivity of an imaging element 6 is compensated. Concretely speaking, the correction of the aperture value roughly adjusts the output level of the imaging element 6 and the correction of the shutter speed adjusts it finely.

In this manner, in the third embodiment, not only the aperture value but also the shutter speed is corrected. As a result, the output level of the imaging element 6 can be adjusted finely. Since both the aperture value and the shutter speed are changed, each amount of changing can be small compared with a case that only either one is changed. Consequently, a photography can be performed in an exposure condition close to the original exposure condition, and a photographer does not feel strange even if compensating of the sensitivity is performed.

Fourth Embodiment

In a fourth embodiment, the second embodiment and the third embodiment are combined, and both an aperture value and a shutter speed are corrected in consideration of manufacturing variations of micro-lenses. Since the construction of the fourth embodiment is common to the construction of the second embodiment, the construction will not be explained. In an EEPROM 13 of the fourth embodiment, a plurality of correction patterns that show how much the aperture value and the shutter speed, which are obtained by an exposure calculation, should be corrected. Each of the correction patterns shows a corrected aperture value and a corrected shutter speed against a combination of an aperture value and a shutter speed obtained on a certain brightness value. One EV value is divided into twelve values in the shutter speed, consequently the shutter speed can be corrected finely.

Figure 7:
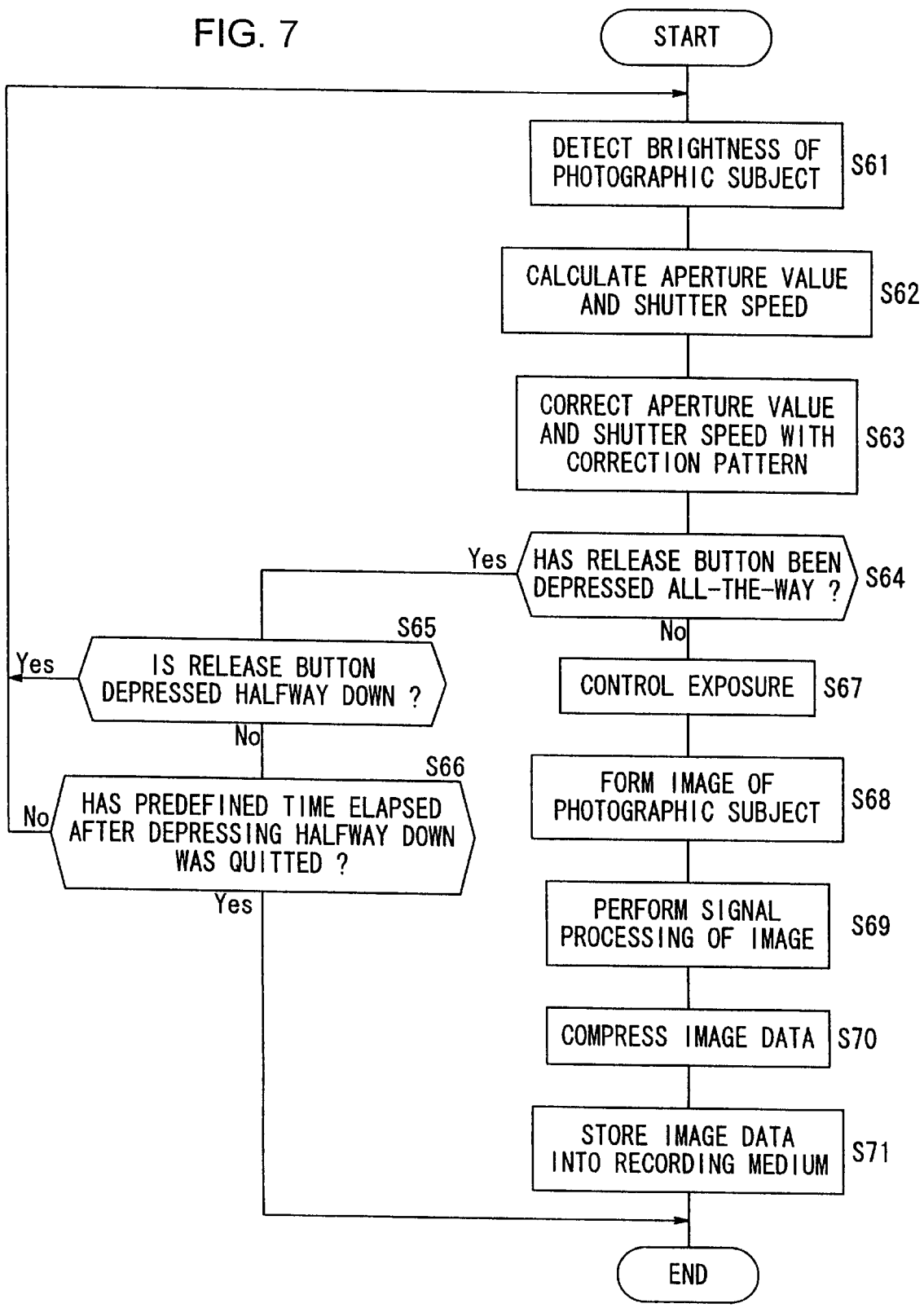
FIG. 7 is a flow chart showing an operation of a control circuit of a fourth embodiment.

FIG. 7 is a flow chart showing an operation of a control circuit 10 of the fourth embodiment. In steps of FIG. 7, since the step S63 is only different from the third embodiment, this step will be explained mainly. The flow of control goes to the step S63 after the aperture value has been calculated by the exposure calculation in the step S62. In the step S63, the correction pattern that was selected in a selecting operation of correction pattern, which has been explained in the second embodiment, is read out from an EEPROM 13 and the aperture value and the shutter speed is corrected based on the correction pattern, and then an aperture 2 and a shutter 5 are controlled based on the corrected aperture value and the corrected shutter speed.

In this manner, in the fourth embodiment, since the aperture value and the shutter speed are corrected in consideration of manufacturing variations of micro-lenses, dropping of the sensitivity of the imaging element 6 can be compensated accurately.

Fifth Embodiment

Figure 8:
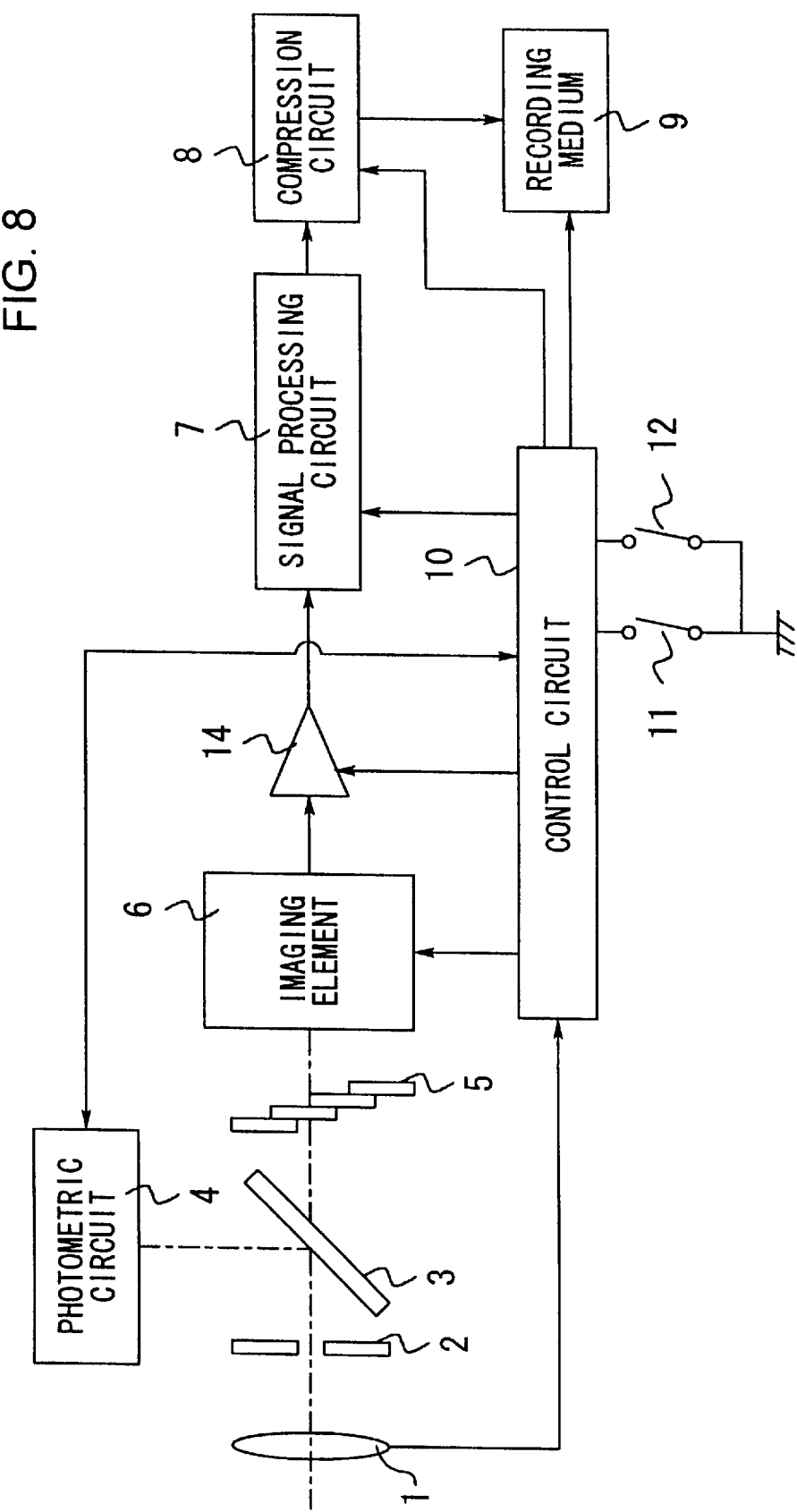
FIG. 8 is a block diagram of a fifth embodiment of an imaging device according to the present invention.

In a fifth embodiment, an amplifying circuit that electrically amplifies an output of an imaging element is provided, and an aperture value and an amplification factor are corrected based on the aperture value calculated by an exposure calculation. FIG. 8 is a block diagram showing an outline of a construction of an imaging device of the fifth embodiment. The construction of the imaging device of the fifth embodiment is common to the construction of the first embodiment except adding the amplifying circuit 14.

Figure 9:
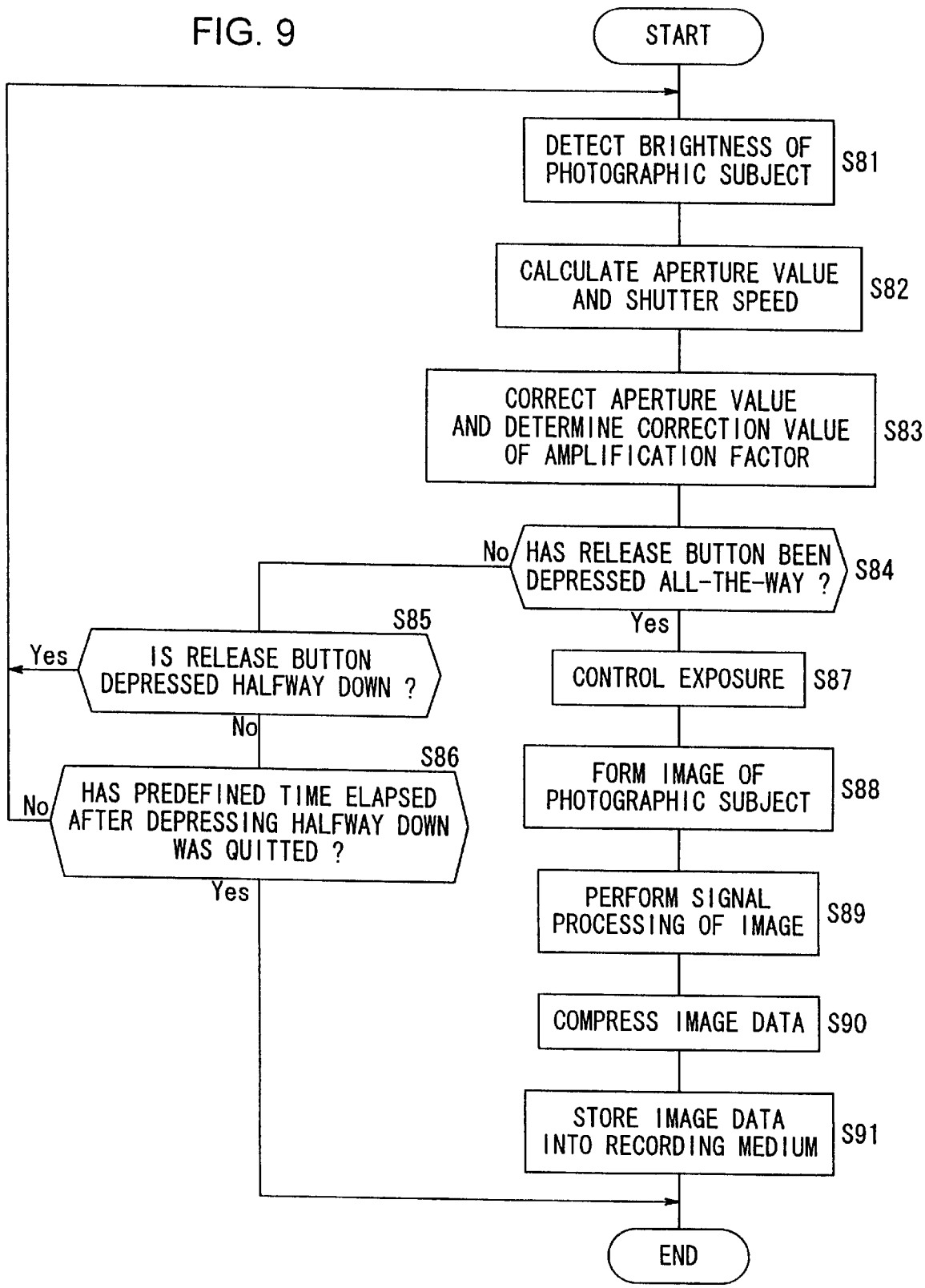
FIG. 9 is a flow chart showing an operation of a control circuit of a fifth embodiment.

FIG. 9 is a flow chart showing an operation of a control circuit 10 of the fifth embodiment. In steps of FIG. 9, since the step S83 is only different from the first embodiment, this step will be explained mainly. The flow of control goes to the step S83 after the aperture value has been calculated by the exposure calculation in the step S82. In the step S83, the aperture value is corrected and the correction value of the amplification factor is determined so that dropping of the sensitivity of the imaging element 6 is compensated. Concretely speaking, the correction of the aperture value roughly adjusts the output level of the imaging element 6 and the correction of the amplification factor adjusts it finely.

In this manner, in the fifth embodiment, since the aperture value is corrected and the correction value of the amplification factor of the amplifying circuit 14 is determined based on the aperture value obtained by the exposure calculation, an amount of changing of the aperture value can be small compared with a case that only the aperture value is corrected. In other words, a photography can be performed in an aperture value close to the value of the exposure calculation. The amplification factor of the amplifying circuit 14 can be changed as an analogue signal, an output level of the imaging element 6 can be adjusted finely.

Sixth Embodiment

Figure 10:
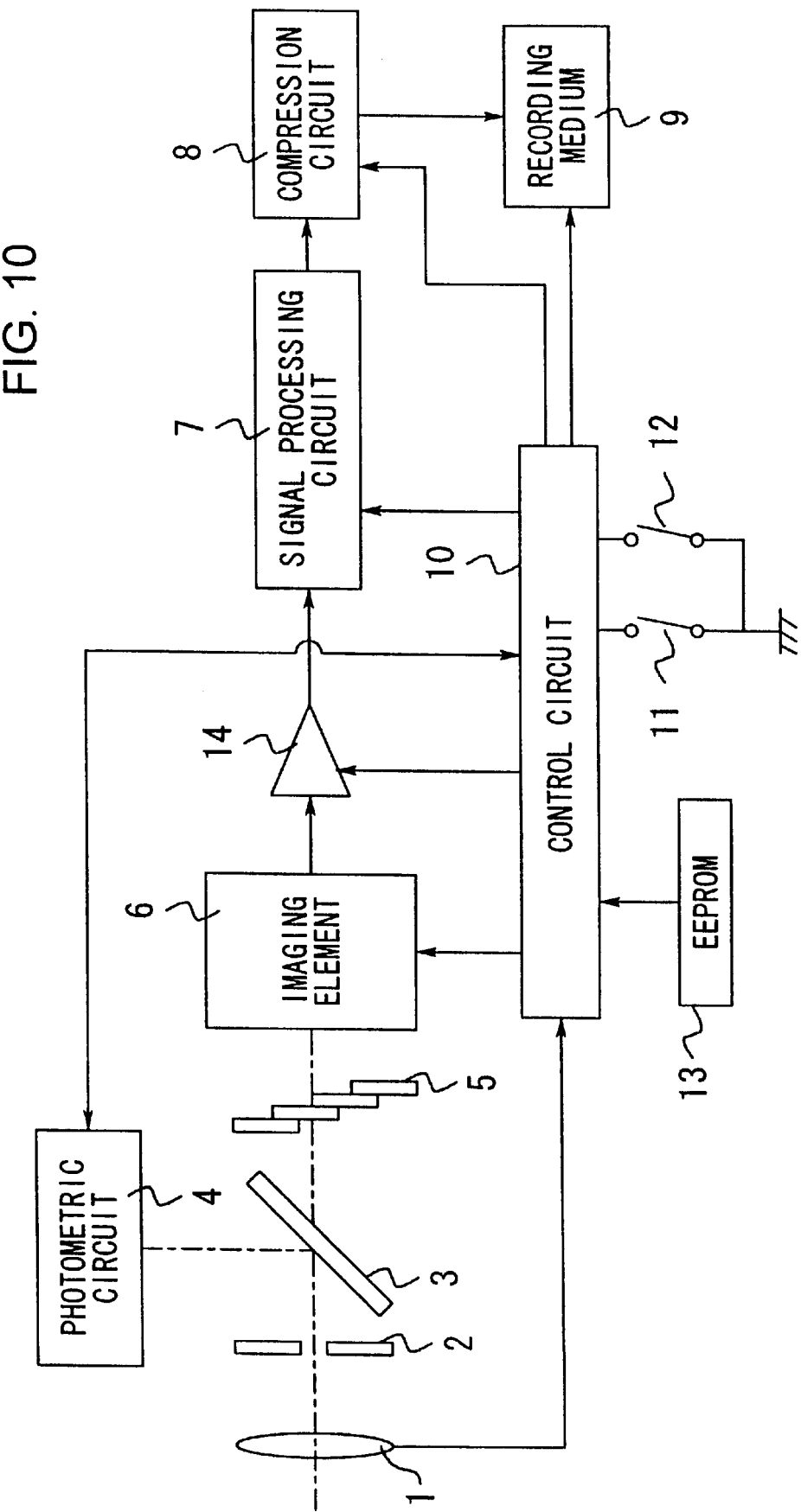
FIG. 10 is a block diagram of a sixth embodiment of an imaging device according to the present invention.

In a sixth embodiment, an aperture value obtained by an exposure calculation and an amplification factor are corrected in consideration of manufacturing variations of micro-lenses. FIG. 10 is a block diagram showing an outline of a construction of an imaging device of the sixth embodiment. The construction of the imaging device of the sixth embodiment is common to the construction of the fifth embodiment except adding an EEPROM 13. In the EEPROM 13 of the sixth embodiment, a plurality of correction patterns that show how much the aperture value, which is obtained by the exposure calculation, should be corrected and what value of the amplification factor of the amplifying circuit 14 should be set to.

Figure 11:
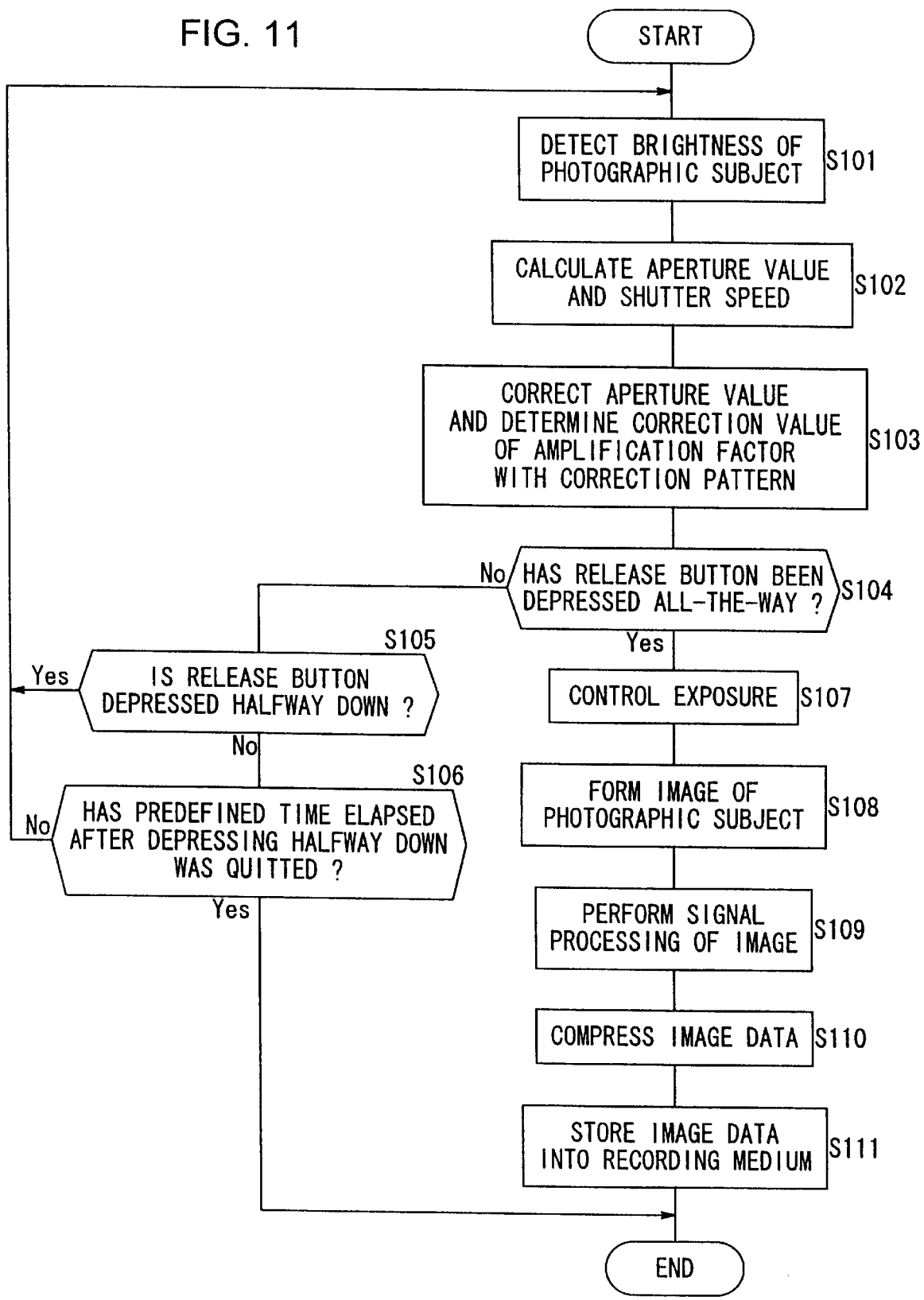
FIG. 11 is a flow chart showing an operation of a control circuit of a sixth embodiment.

FIG. 11 is a flow chart showing an operation of a control circuit 10 of the sixth embodiment. In steps of FIG. 11, since the step S103 is only different from the first embodiment, this step will be explained mainly. The flow of control goes to the step S103 after the aperture value has been calculated by the exposure calculation in the step S102. In the step S103, the correction pattern that was selected in a selecting operation of correction pattern is read out from the EEPROM 13 and the aperture value is corrected and the correction value of the amplification factor of the amplifying circuit 14 is determined based on the aperture value calculated by the exposure calculation and the correction pattern read out from the EEPROM 13.

In this manner, in the sixth embodiment, a plurality of correction patterns, which are corresponding to micro lenses respectively and each of which shows the correction amount of the aperture value and the amplification factor of the amplifying circuit 14, are previously prepared in consideration of different characteristics of the micro lenses that are caused from manufacturing variations. And the most suitable correction pattern is selected for each imaging element 6 and the aperture value and the amplification factor of the amplifying circuit 14 are corrected based on the most suitable correction pattern. As a result, the sensitivity of the imaging element 6 can be maintained with a constant level, even if manufacturing variations occurs on the micro-lenses.

Seventh Embodiment

In a seventh embodiment, an aperture value obtained by an exposure calculation is corrected based on an exit pupil position of a photographic lens. Since a construction of the seventh embodiment is common to the construction of the first embodiment, the construction will not be explained.

Figure 12:
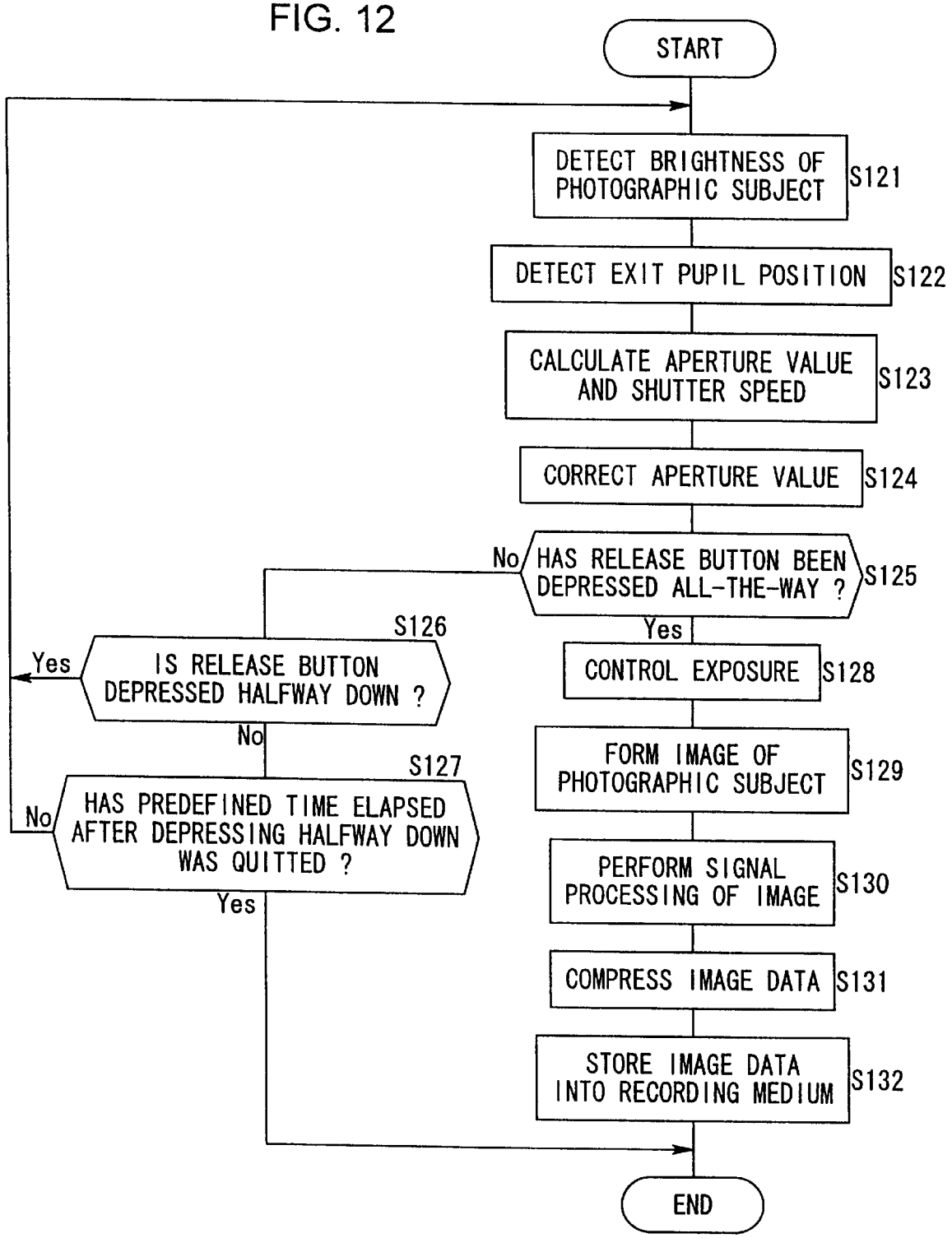
FIG. 12 is a flow chart showing an operation of a control circuit of a seventh embodiment.

FIG. 12 is a flow chart showing an operation of a control circuit 10 of the seventh embodiment. In steps of FIG. 12, since the steps S122 and S124 are only different from the first embodiment, these steps will be explained mainly. The flow of control goes to the step S122 after a brightness of a photographic subject has been detected in the step S121, and the exit pupil position of the photographic lens 1 is detected. The exit pupil position varies according to a kind of the photographic lens 1, and in case of a zoom lens, the exit pupil position varies according to zooming position also. A lens CPU (not shown in Figure) in the photographic lens 1 transmits information regarding the exit pupil position of the photographic lens 1 to a control circuit 10 in a camera body via a communication line L. Consequently, the exit pupil position is detected by reading in data of the communication line L.

The flow of control goes to the step S124 after the aperture value has been calculated by the exposure calculation, and the aperture value calculated by the exposure calculation is corrected based on the exit pupil position of the photographic lens 1.

Figure 13:
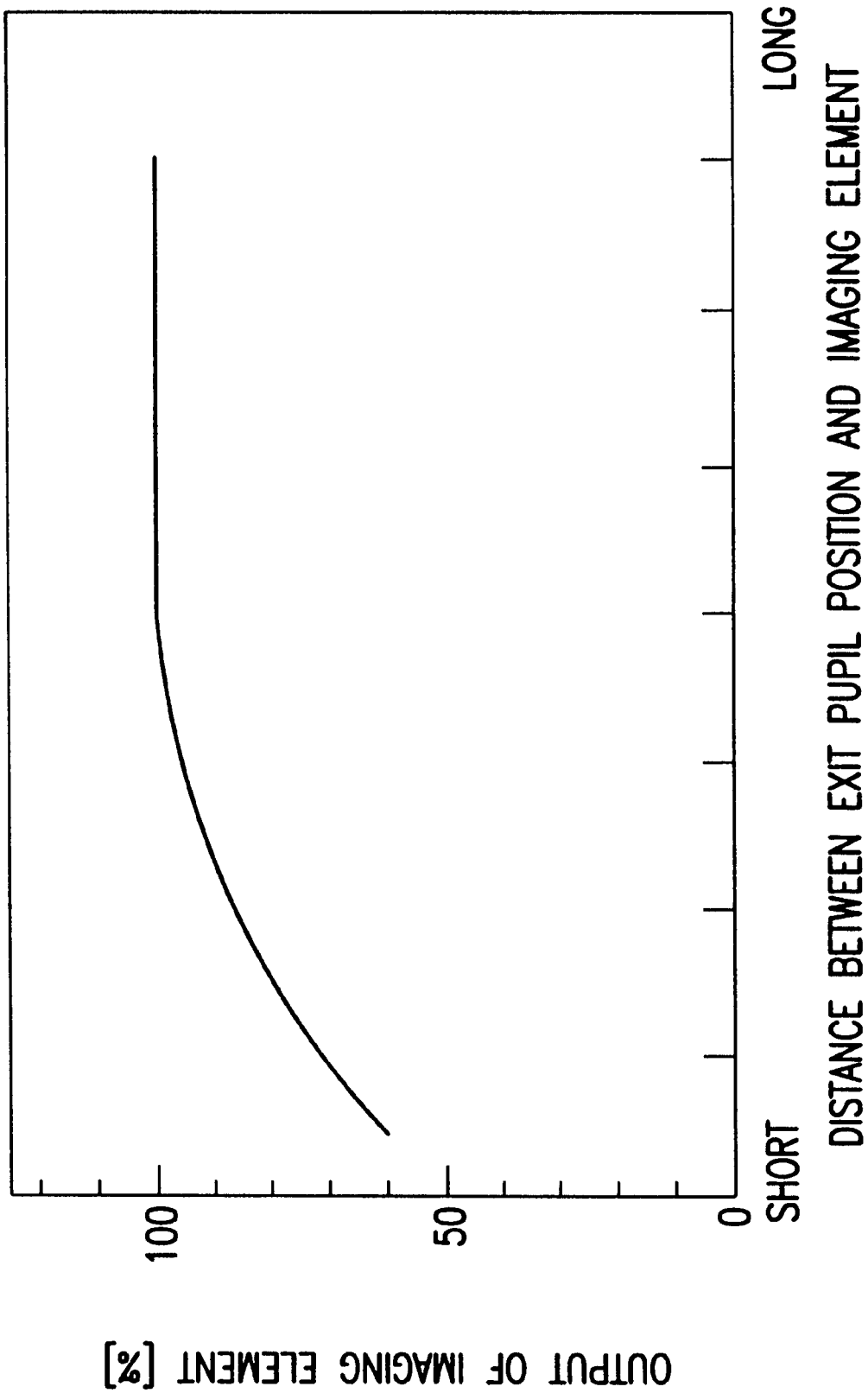
FIG. 13 is a figure showing a relation between a distance between an exit pupil position and an imaging element, and an output level of the imaging element.

FIG. 13 is a figure showing a relation between a distance between the exit pupil position and the imaging element 6 and an output level of the imaging element 6. As shown in Figure, when the distance between the exit pupil position and the imaging element 6 is long, the sensitivity of the imaging element 6 does not drop and the output level is maintained in almost 100%. However, the sensitivity drops according as the distance between the exit pupil position and the imaging element 6 becomes short. Therefore, in the step S127 of FIG. 12, the shorter the distance between the exit pupil position and the imaging element 6 is, the smaller value the calculated aperture value is corrected to.

In this manner, in the seventh embodiment, since the aperture value is corrected based on the exit pupil position, the sensitivity of the imaging element 6 does not drop even if the photographic lens is exchanged or zooming position of the zoom lens is changed.

Eighth Embodiment

An eighth embodiment is an embodiment that modifies the second embodiment. In the eighth embodiment, an aperture value obtained by an exposure calculation is corrected based on an exit pupil position of a photographic lens in consideration of manufacturing variations of micro-lenses. Since the construction of the eighth embodiment is common to the construction of the second embodiment, the construction will not be explained.

Figure 14:
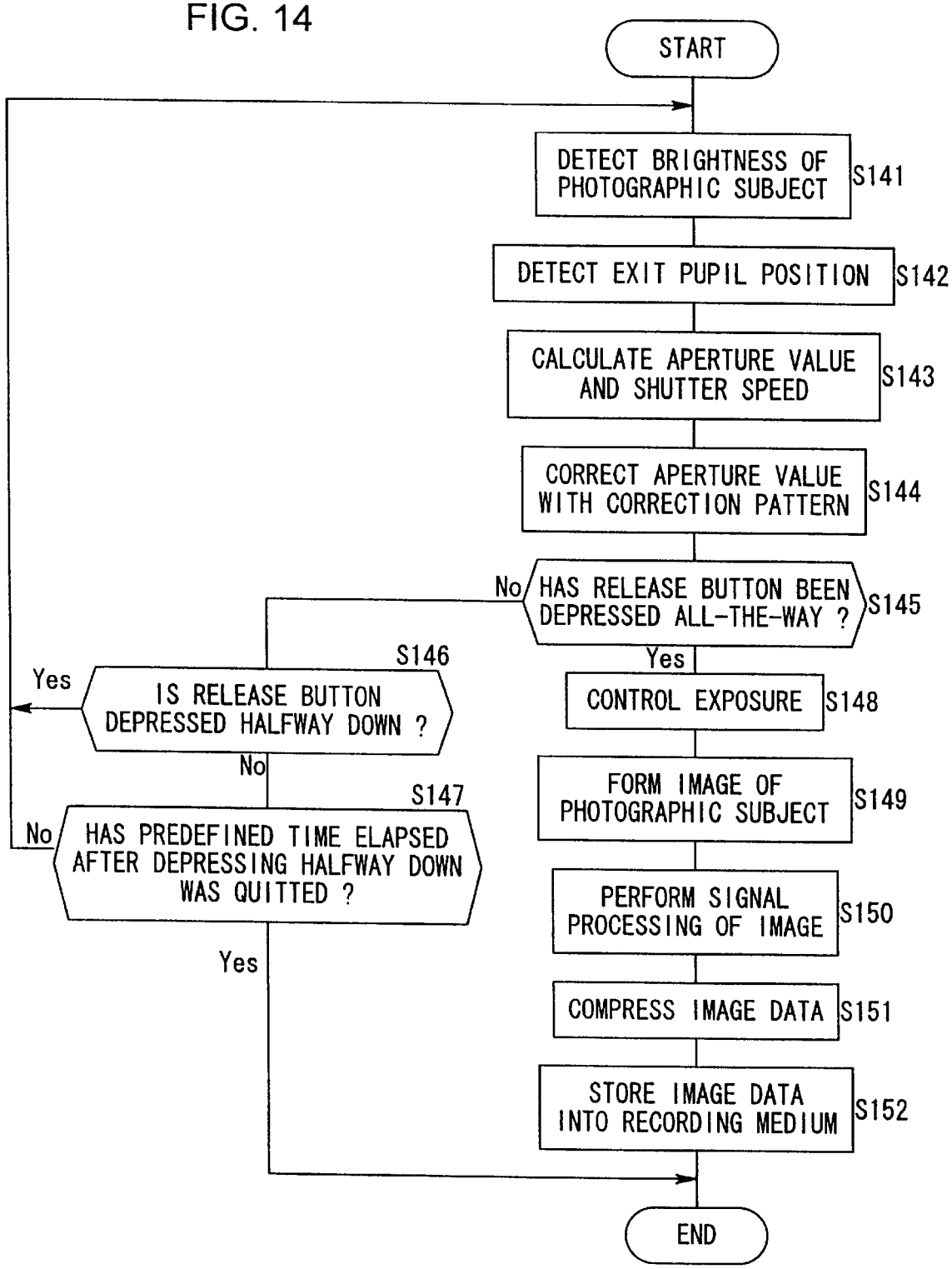
FIG. 14 is a flow chart showing an operation of a control circuit of an eighth embodiment.

FIG. 14 is a flow chart showing an operation of a control circuit 10 of the eighth embodiment. In steps of FIG. 14, since the steps S142 and S144 are only different from the second embodiment, these steps will be explained mainly. The flow of control goes to the step S142 after a brightness of a photographic subject has been detected in the step S141, and the exit pupil position of the photographic lens 1 is detected in the same way as the seventh embodiment. In the step S144, the aperture value calculated by the exposure calculation is corrected based on the exit pupil position of the photographic lens 1 and the correction pattern read out from an EEPROM 13.

In this manner, in the eighth embodiment, since the aperture value is corrected based on the exit pupil position and the correction pattern considering manufacturing variations of micro-lenses, dropping of the sensitivity of the imaging element 6 that is caused from manufacturing variations can be compensated accurately.

Ninth Embodiment

An ninth embodiment is an embodiment that modifies the third embodiment. In the ninth embodiment, an aperture value and a shutter speed obtained by an exposure calculation are corrected based on an exit pupil position of a photographic lens. Since the construction of the ninth embodiment is common to the construction of the third embodiment, the construction will not be explained.

Figure 15:
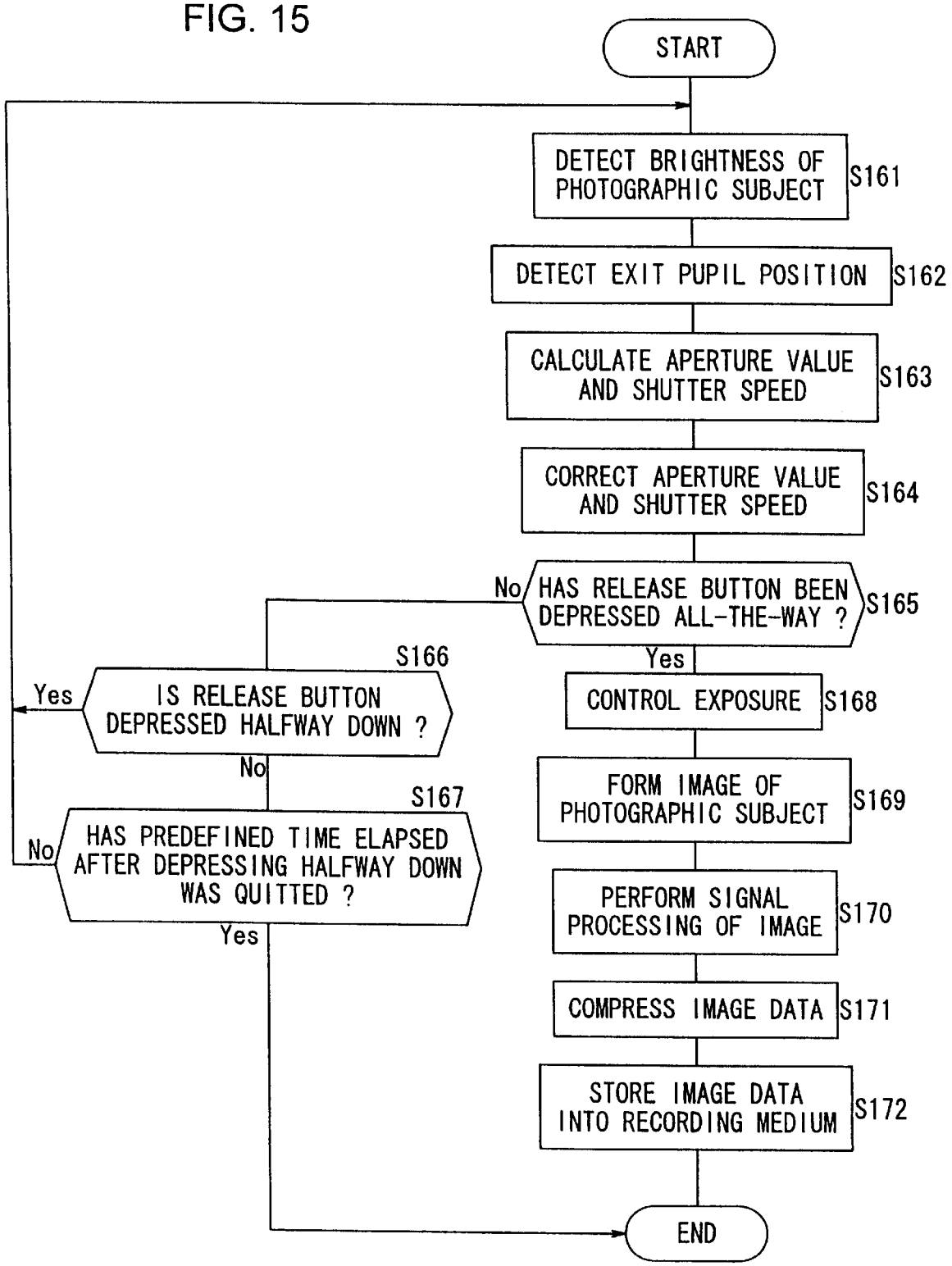
FIG. 15 is a flow chart showing an operation of a control circuit of a ninth embodiment.

FIG. 15 is a flow chart showing an operation of a control circuit 10 of the ninth embodiment. In steps of FIG. 15, since the steps S162 and S164 are only different from the third embodiment, these steps will be explained mainly. The flow of control goes to the step S162 after a brightness of a photographic subject has been detected in the step S161, and the exit pupil position of the photographic lens 1 is detected in the same way as the seventh embodiment. In the step S164, the aperture value and the shutter speed calculated by the exposure calculation are corrected based on the exit pupil position of the photographic lens 1.

In this manner, in the ninth embodiment, dropping of the sensitivity of the imaging element 6 that is caused from kinds of the photographic lens 1 or variation of zooming position can be compensated accurately.

Tenth Embodiment

An tenth embodiment is an embodiment that modifies the fourth embodiment. In the tenth embodiment, an aperture value and a shutter speed obtained by an exposure calculation are corrected based on an exit pupil position of a photographic lens in consideration of manufacturing variations of micro-lenses. Since the construction of the tenth embodiment is common to the construction of the fourth embodiment, the construction will not be explained.

Figure 16:
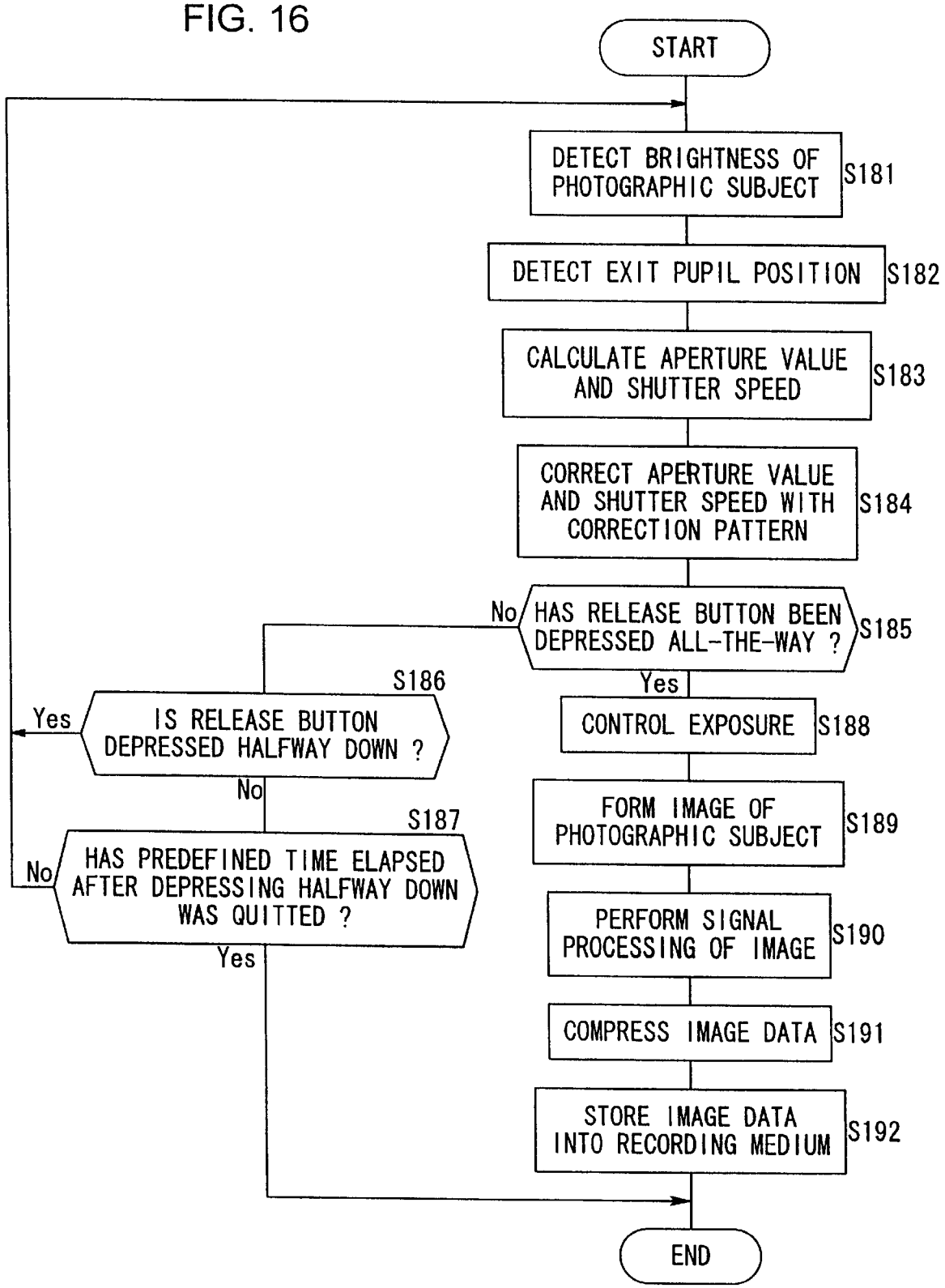
FIG. 16 is a flow chart showing an operation of a control circuit of a tenth embodiment.

FIG. 16 is a flow chart showing an operation of a control circuit 10 of the tenth embodiment. In steps of FIG. 16, since the steps S182 and S184 are only different from the fourth embodiment, these steps will be explained mainly. The flow of control goes to the step S182 after a brightness of a photographic subject has been detected in the step S181, and the exit pupil position of the photographic lens 1 is detected in the same way as the seventh embodiment. In the step S184, the aperture value and the shutter speed calculated by the exposure calculation are corrected based on the exit pupil position of the photographic lens 1 and a correction pattern read out from an EEPROM 13. The correction patterns shows a corrected aperture value and a corrected shutter speed against a combination of the aperture value and the shutter speed obtained by the exposure calculation.

In this manner, in the tenth embodiment, dropping of the sensitivity of the imaging element 6 that is caused from kinds of the photographic lens 1 or variation of zooming position can be compensated accurately.

Eleventh Embodiment

An eleventh embodiment is an embodiment that modifies the fifth embodiment. In the eleventh embodiment, an aperture value obtained by an exposure calculation and an amplification factor of an amplifying circuit 14 are corrected based on an exit pupil position of a photographic lens. Since the construction of the eleventh embodiment is common to the construction of the fifth embodiment, the construction will not be explained.

Figure 17:
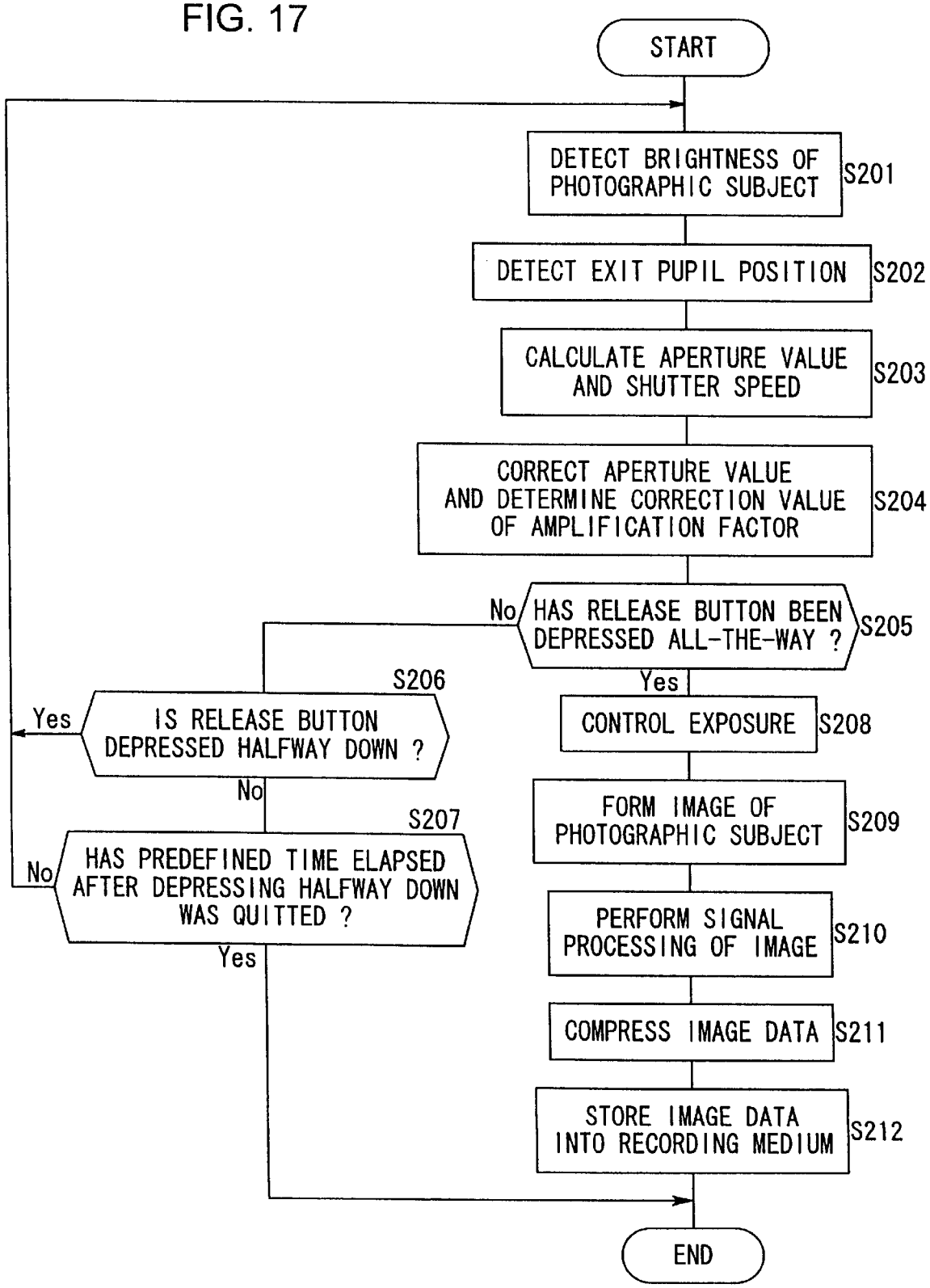
FIG. 17 is a flow chart showing an operation of a control circuit of an eleventh embodiment.

FIG. 17 is a flow chart showing an operation of a control circuit 10 of the eleventh embodiment. In steps of FIG. 17, since the steps S202 and S204 are only different from the fifth embodiment, these steps will be explained mainly. The flow of control goes to the step S202 after a brightness of a photographic subject has been detected in the step S201, and the exit pupil position of the photographic lens 1 is detected in the same way as the seventh embodiment. In the step S204, the aperture value calculated by the exposure calculation and the amplification factor of the amplifying circuit 14 are corrected based on the exit pupil position of the photographic lens 1.

In this manner, in the eleventh embodiment, dropping of the sensitivity of the imaging element 6 that is caused from kinds of the photographic lens 1 or variation of zooming position can be compensated accurately.

Twelfth Embodiment

An twelfth embodiment is an embodiment that modifies the sixth embodiment. In the sixth embodiment, an aperture value obtained by an exposure calculation and an amplification factor of an amplifying circuit are corrected based on an exit pupil position of a photographic lens in consideration of manufacturing variations of micro-lenses. Since the construction of the twelfth embodiment is common to the construction of the sixth embodiment, the construction will not be explained.

Figure 18:
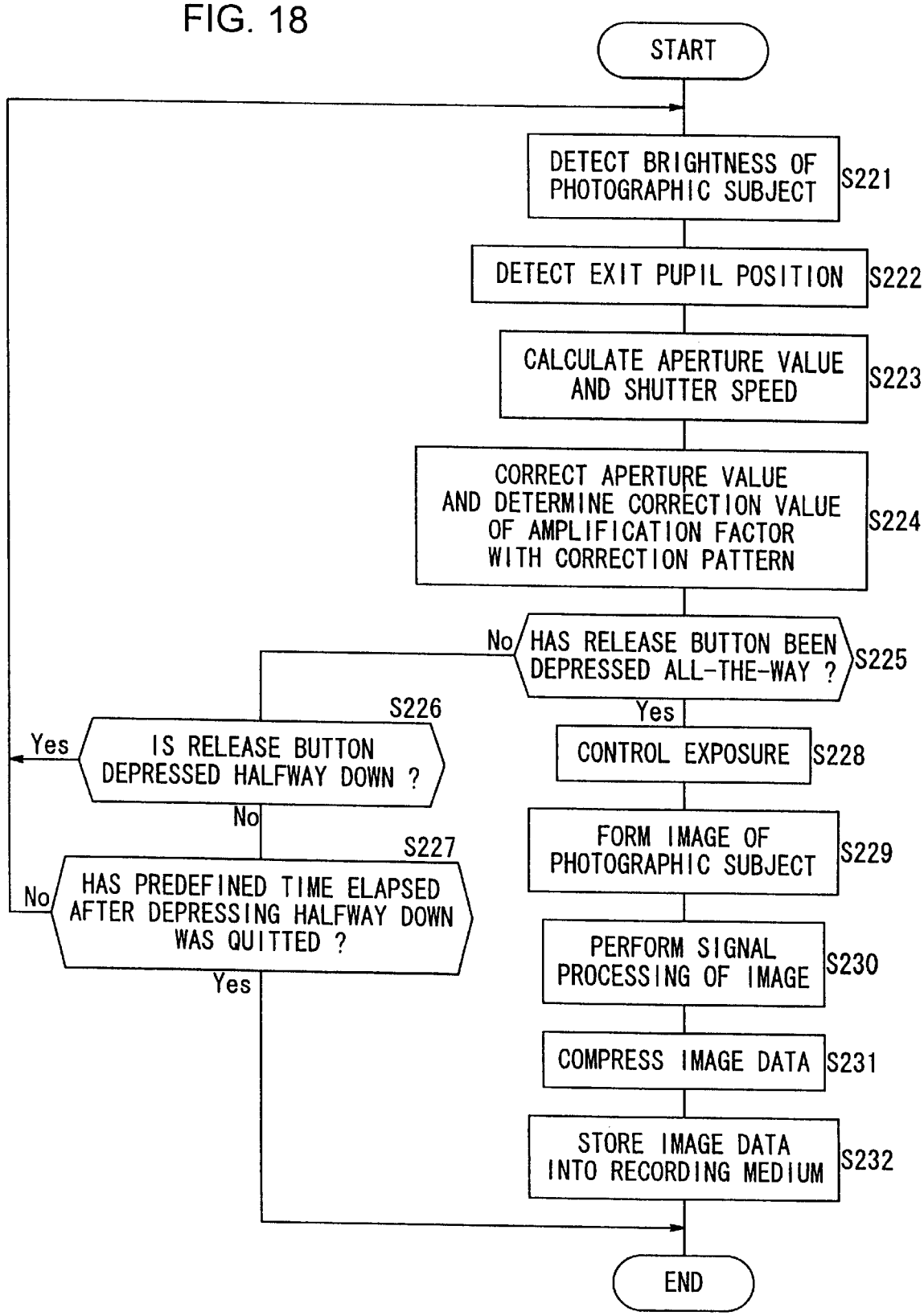
FIG. 18 is a flow chart showing an operation of a control circuit of a twelfth embodiment.

FIG. 18 is a flow chart showing an operation of a control circuit 10 of the twelfth embodiment. In steps of FIG. 18, since the steps S222 and S224 are only different from the sixth embodiment, these steps will be explained mainly. The flow of control goes to the step S222 after a brightness of a photographic subject has been detected in the step S221, and the exit pupil position of the photographic lens 1 is detected in the same way as the seventh embodiment. In the step S224, the aperture value calculated by the exposure calculation and the amplification factor of the amplifying circuit 14 are corrected based on the exit pupil position of the photographic lens 1 and a correction pattern read out from an EEPROM 13. The correction patterns shows a corrected aperture value and a corrected amplification factor against the aperture value obtained by the exposure calculation.

In this manner, in the twelfth embodiment, dropping of the sensitivity of the imaging element 6 that is caused from kinds of the photographic lens 1 or variation of zooming position can be compensated accurately.

Thirteenth Embodiment

In a thirteenth embodiment, an aperture value and a shutter speed is calculated in consideration of an output of an imaging element when an exposure calculation is performed. Since the construction of the thirteenth embodiment is common to the construction of the first embodiment, the construction will not be explained.

Figure 19:
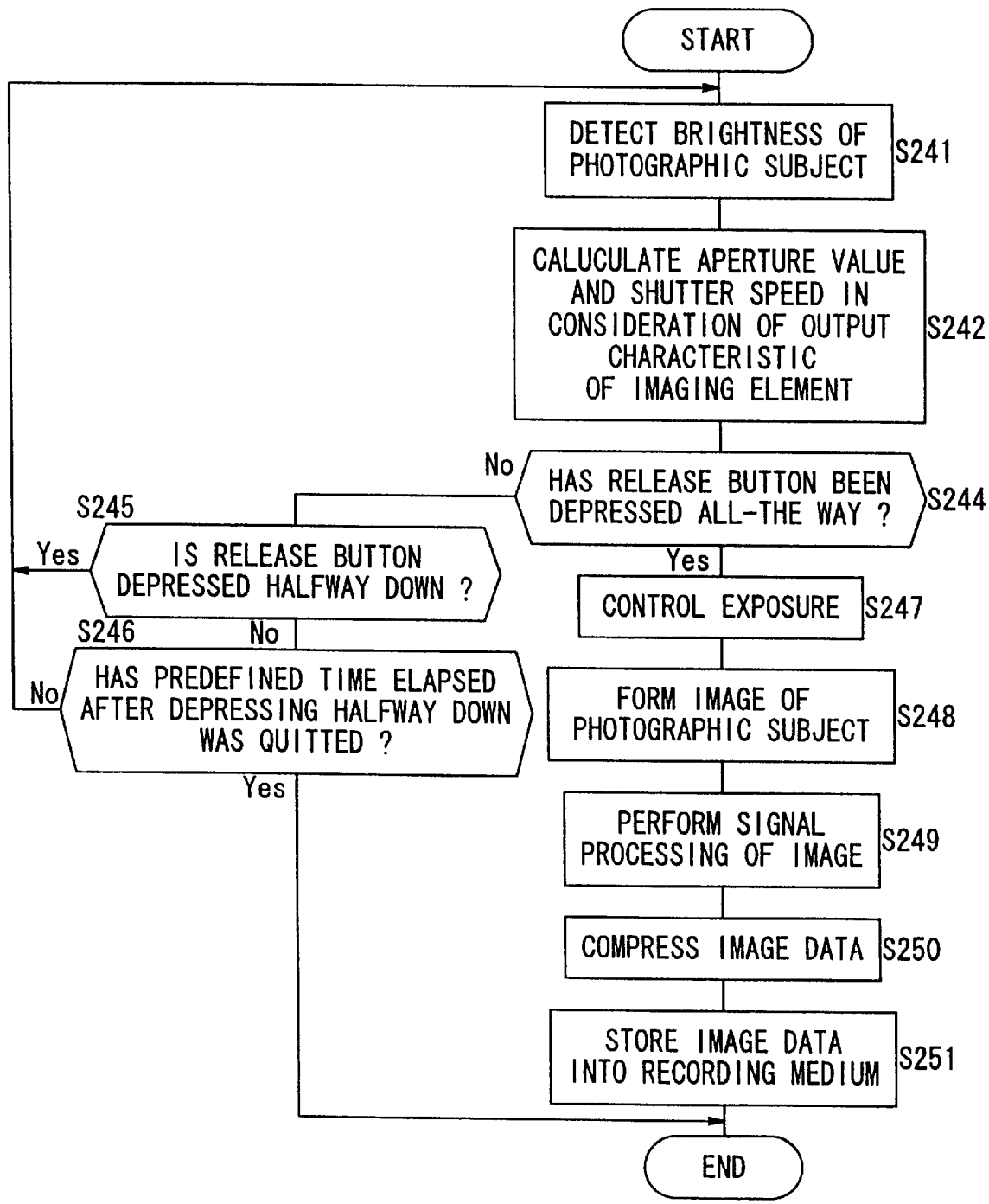
FIG. 19 is a flow chart showing an operation of a control circuit of a thirteenth embodiment.
Figure 20:
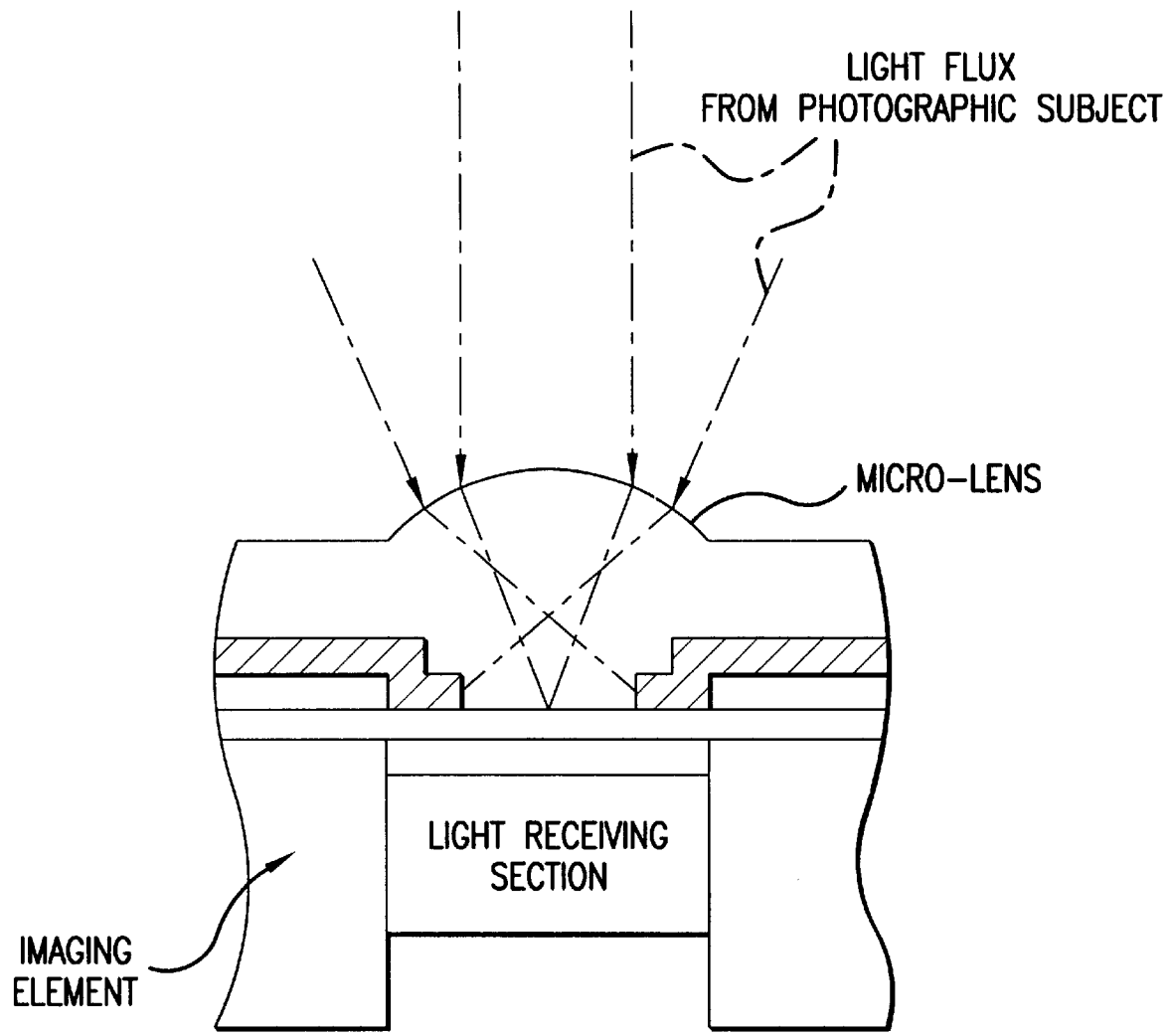
FIG. 20 is a figure showing a construction of a micro-lens that is attached in front of a photo-electric element.

FIG. 19 is a flow chart showing an operation of a control circuit 10 of the thirteenth embodiment. In the flow chart of FIG. 19, the step S2 of FIG. 2 of the first embodiment is changed to the step S242 and the step S3 of FIG. 2 is deleted, and the other steps are the same as steps of FIG. 2. Consequently, different parts will be explained mainly. In the step S242, an aperture value and a shutter speed are calculated based on a characteristic program line that is made in advance in consideration of the output characteristic of the imaging element 6. The characteristic program line is made and stored in a camera in advance so that in case that the aperture value is small, still smaller aperture value is selected so as to compensate dropping of the output characteristic of the imaging element 6. And it is also acceptable that the characteristic program line is made so as to compensate dropping of the output characteristic of the imaging element 6 by using a combination of the aperture value and the shutter speed in stead of only the aperture value when the aperture value is small.

In this manner, in the thirteenth embodiment, a step of a correcting calculation can be deleted and an operation of the control circuit 10 becomes simple.

In the above-mentioned first embodiment through sixth embodiment, the aperture value, the shutter speed and the amplification factor are corrected based on the aperture value obtained by the exposure calculation. And in the above-mentioned seventh embodiment through twelfth embodiment, the aperture value, the shutter speed and the amplification factor are corrected based on the exit pupil position of the photographic lens. However, it is acceptable that the aperture value, the shutter speed and the amplification factor are corrected based on both the aperture value obtained by the exposure calculation and the exit pupil position of the photographic lens. In this case, both a correction amount based on the aperture value and a correction amount based on the exit pupil position are should be corrected.

In the above-mentioned first through twelfth embodiments, the correction of only the aperture value, the correction of the aperture value and the shutter speed, and the correction of the aperture value and the amplification factor have been explained. However, a correction of a combination of the three aperture value, shutter speed and amplification factor are also acceptable.

It is also acceptable that changed values are displayed on a display section of a viewfinder when the aperture value and the shutter speed obtained by the exposure calculation are changed. And it is acceptable that a photographer's confirmation is required whether or not the values should be changed. And it is acceptable that a photographer can optionally select one of methods based on the first through the twelfth embodiments to correct the sensitivity.

We claim:

1. An imaging device, comprising:
    a photometric circuit that detects a brightness of a photographic subject based on a light flux from the photographic subject that passes through a photographic lens;
    an exposure calculation circuit that calculates an aperture value and a shutter speed based on said detected brightness of the photographic subject;
    an imaging element that converts the light flux from the photographic subject into an electric signal and outputs the electric signal, the amount of light flux received from the photographic subject being controlled by said aperture value and said shutter speed, said imaging element being separate from said photometric circuit and having a plurality of photo-electric elements and a micro-lens with a plurality of corresponding micro-lens elements, said micro-lens elements facing said photo-electric elements to converge the light flux from the photographic subject to a light receiving surface of each of said photo-electric elements, wherein the electric signal output by said imaging element represents a captured image of the photographic subject; and
    a correction circuit that corrects said aperture value calculated by said exposure calculation circuit to correct a change in sensitivity due to an incident angle of the light flux from the photographic subject onto each of said micro-lens elements, wherein said correction circuit corrects said aperture value based on said aperture value calculated by said exposure calculation circuit.

2. An imaging device, comprising:
    a photometric circuit that detects a brightness of a photographic subject based on a light flux from the photographic subject that passes through a photographic lens;
    an exposure calculation circuit that calculates an aperture value and an shutter speed based on said detected brightness of the photographic subject;
    an imaging element that converts the light flux from the photographic subject into an electric signal and outputs the electric signal, the amount of light flux received from the photographic subject being controlled by said aperture value and said shutter speed, said imaging element being separate from said photometric circuit and having a plurality of photo-electric elements and a micro-lens with a plurality of corresponding micro-lens elements, said micro-lens elements facing said photo-electric elements to converge the light flux from the photographic subject to a light receiving surface of each of said photo-electric elements, wherein in the electric signal output by said imaging element represents a captured image of the photographic subject;
    an exit pupil position detector that detects an exit pupil position of said photographic lens; and
    a correction circuit that corrects said aperture value calculated by said exposure calculation circuit to correct a change in sensitivity due to an incident angle of the light flux from the photographic subject onto each of said micro-lens elements, wherein said correction circuit corrects said aperture value based on said exit pupil position detected by said exit pupil position detector and said aperture value calculated by said exposure calculation circuit.

3. An imaging device according to claim 1, further comprising:
    an exit pupil position detector that detects an exit pupil position of said photographic lens, wherein
    said correction circuit corrects said aperture value based on said aperture value calculated by said exposure calculation circuit and said exit pupil position detected by said exit pupil position detector.

4. An imaging device according to claim 1, further comprising:
    a correction pattern memory that stores a plurality of correction patterns to correct said aperture value, said correction patterns respectively corresponding to a plurality of said micro-lenses that have different characteristics respectively, wherein
    said correction circuit reads out said correction pattern corresponding to said micro-lens of said imaging element from said correction pattern memory and corrects said aperture value based on said read out correction pattern and said aperture value calculated by said exposure calculation circuit.

5. An imaging device according to claim 2, further comprising:
    a correction pattern memory that stores a plurality of correction patterns to correct said aperture value, said correction patterns respectively corresponding to a plurality of said micro-lenses that have different characteristics respectively, wherein
    said correction circuit reads out said correction pattern corresponding to said micro-lens of said imaging element from said correction pattern memory and corrects said aperture value based on said read out correction pattern and said exit pupil position detected by said exit pupil position detector.

6. An imaging device according to claim 3, further comprising:
    a correction pattern memory that stores a plurality of correction patterns to correct said aperture value, said correction patterns respectively corresponding to a plurality of said micro-lenses that have different characteristics respectively, wherein
    said correction circuit reads out said correction pattern corresponding to said micro-lens of said imaging element from said correction pattern memory and corrects said aperture value based on said read out correction pattern, said aperture value calculated by said exposure calculation circuit and said exit pupil position detected by said exit pupil position detector.

7. An imaging device, comprising:
    a photometric circuit that detects a brightness of a photographic subject based on a light flux from the photographic subject that passes through a photographic lens;
    an exposure calculation circuit that calculates an aperture value and a shutter speed based on said detected brightness of the photographic subject;

an imaging element that converts the light flux from the photographic subject into an electric signal and outputs the electric signal, the amount of light flux received from the photographic subject being controlled by said aperture value and said shutter speed, said imaging element being separate from said photometric circuit and having a plurality of photo-electric elements and a micro-lens with a plurality of corresponding micro-lens elements, said micro-lens elements facing said photo-electric elements to converge the light flux from the photographic subject to a light receiving surface of each of said photo-electric elements, wherein the electric signal output by said imaging element represents a captured image of the photographic subject; and a correction circuit that corrects said aperture value and said shutter speed calculated by said exposure calculation circuit to correct a change in sensitivity due to an incident angle of the light flux from the photographic subject onto each of said micro-lens elements, wherein said correction circuit corrects said aperture value and said shutter speed based on said aperture value calculated by said exposure calculation circuit.

8. An imaging device, comprising:

a photometric circuit that detects a brightness of a photographic subject based on a light flux from the photographic subject that passes through a photographic lens;

an exposure calculation circuit that calculates an aperture value and a shutter speed based on said detected brightness of the photographic subject;

an imaging element that converts the light flux from the photographic subject into an electric signal and outputs the electric signal, the amount of light flux received from the photographic subject being controlled by said aperture value and said shutter speed, said imaging element being separate from said photometric circuit and having a plurality of photo-electric elements and a micro-lens with a plurality of corresponding micro-lens elements, said micro-lens elements facing said photo-electric elements to converge the light flux from the photographic subject to a light receiving surface of each of said photo-electric elements, wherein the electric signal output by said imaging element represents a captured image of the photographic subject;

an exit pupil position detector that detects an exit pupil position of said photographic lens; and a correction circuit that corrects said aperture value and said shutter speed calculated by said exposure calculation circuit to correct a change in sensitivity due to an incident angle of the light flux from the photographic subject onto each of said micro-lens elements, wherein said correction circuit corrects said aperture value and said shutter speed based on said exit pupil position detected by said exit pupil position detector and said aperture value calculated by said exposure calculation circuit.

9. An imaging device according to claim 7, further comprising:

an exit pupil position detector that detects an exit pupil position of said photographic lens, wherein said correction circuit corrects said aperture value and said shutter speed based on said aperture value calculated by said exposure calculation circuit and said exit pupil position detected by said exit pupil position detector.

10. An imaging device according to claim 7, further comprising:

a correction pattern memory that stores a plurality of correction patterns to correct said aperture value and said shutter speed, said correction patterns respectively corresponding to a plurality of said micro-lenses that have different characteristics respectively, wherein said correction circuit reads out said correction pattern corresponding to said micro-lens of said imaging element from said correction pattern memory and corrects said aperture value and said shutter speed based on said read out correction pattern and said aperture value calculated by said exposure calculation circuit.

11. An imaging device according to claim 8, further comprising:

a correction pattern memory that stores a plurality of correction patterns to correct said aperture value and said shutter speed, said correction patterns respectively corresponding to a plurality of said micro-lenses that have different characteristics respectively, wherein said correction circuit reads out said correction pattern corresponding to said micro-lens of said imaging element from said correction pattern memory and corrects said aperture value and said shutter speed based on said read out correction pattern and said exit pupil position detected by said exit pupil position detector.

12. An imaging device according to claim 9, further comprising:

a correction pattern memory that stores a plurality of correction patterns to correct said aperture value and said shutter speed, said correction patterns respectively corresponding to a plurality of said micro-lenses that have different characteristics respectively, wherein said correction circuit reads out said correction pattern corresponding to said micro-lens of said imaging element from said correction pattern memory and corrects said aperture value and said shutter speed based on said read out correction pattern, said aperture value calculated by said exposure calculation circuit and said exit pupil position detector.

13. An imaging device, comprising:

a photometric circuit that detects a brightness of a photographic subject based on a light flux from the photographic subject that passes through a photographic lens;

an exposure calculation circuit that calculates an aperture value and a shutter speed based on said detected brightness of the photographic subject;

an imaging element that converts the light flux from the photographic subject into an electric signal and outputs the electric signal, the amount of light flux received from the photographic subject being controlled by said aperture value and said shutter speed, said imaging element being separate from said photometric circuit and having a plurality of photo-electric elements and a micro-lens with a plurality of corresponding micro-lens elements, said micro-lens elements facing said photo-electric elements to converge the light flux from the photographic subject to a light receiving surface of each of said photo-electric elements, wherein the electric signal output by said imaging element represents a captured image of the photographic subject;

an amplifying circuit that amplifies said electric signal outputted from said imaging element with a predefined amplification factor; and a correction circuit that corrects said aperture value calculated by said exposure calculation circuit and said amplification factor to correct a change in sensitivity due to an incident angle of the light flux from the photographic subject onto each of said micro-lens elements, wherein said correction circuit corrects said aperture value and said amplification factor based on said aperture value calculated by said exposure calculation circuit.

14. An imaging device, comprising:

a photometric circuit that detects a brightness of a photographic subject based on a light flux from the photographic subject that passes through a photographic lens;

an exposure calculation circuit that calculates an aperture value and a shutter speed based on said detected brightness of the photographic subject;

an imaging element that converts the light flux from the photographic subject into an electric signal and outputs the electric signal, the amount of light flux received from the photographic subject being controlled by said aperture value and said shutter speed, said imaging element being separate from said photometric circuit and having a plurality of photo-electric elements and a micro-lens with a plurality of corresponding micro-lens elements, said micro-lens elements facing said photo-electric elements to converge the light flux from the photographic subject to a light receiving surface of each of said photo-electric elements, wherein the electric signal output by said imaging element represents a captured image of the photographic subject;

an amplifying circuit that amplifies said electric signal outputted from said imaging element with a predefined amplification factor;

an exit pupil position detector that detects an exit pupil position of said photographic lens; and a correction circuit that corrects said aperture value calculated by said exposure calculation circuit and said amplification factor to correct a change in sensitivity due to an incident angle of the light flux from the photographic subject onto each of said micro-lens elements, wherein said correction circuit corrects said aperture value and said amplification factor based on said exit pupil position detected by said exit pupil position detector and said aperture value calculated by said exposure calculation circuit.

15. An imaging device according to claim 13, further comprising:

an exit pupil position detector that detects an exit pupil position of said photographic lens, wherein said correction circuit corrects said aperture value and said amplification factor based on said aperture value calculated by said exposure calculation circuit and said exit pupil position detected by said exit pupil position detector.

16. An imaging device according to claim 13, further comprising:

a correction pattern memory that stores a plurality of correction patterns to correct said aperture value and said amplification factor, said correction patterns respectively corresponding to a plurality of said micro-lenses that have different characteristics respectively, wherein said correction circuit reads out said correction pattern corresponding to said micro-lens of said imaging element from said correction pattern memory and corrects said aperture value and said amplification factor based on said read out correction pattern and said aperture value calculated by said exposure calculation circuit.

17. An imaging device according to claim 14, further comprising:

a correction pattern memory that stores a plurality of correction patterns to correct said aperture value and said amplification factor, said correction patterns respectively corresponding to a plurality of said micro-lenses that have different characteristics respectively, wherein said correction circuit reads out said correction pattern corresponding to said micro-lens of said imaging element from said correction pattern memory and corrects said aperture value and said amplification factor based on said read out correction pattern and said exit pupil position detected by said exit pupil position detector.

18. An imaging device according to claim 15, further comprising:

a correction pattern memory that stores a plurality of correction patterns to correct said aperture value and said amplification factor, said correction patterns respectively corresponding to a plurality of said micro-lenses that have different characteristics respectively, wherein said correction circuit reads out said correction pattern corresponding to said micro-lens of said imaging element from said correction pattern memory and corrects said aperture value and said amplification factor based on said read out correction pattern, said aperture value calculated by said exposure calculation circuit and said exit pupil position detected by said exit pupil position detector.

19. An imaging device, comprising:

a photometric circuit that detects a brightness of a photographic subject based on a light flux from the photographic subject that passes through a photographic lens;

an exposure calculation circuit that calculates an aperture value and a shutter speed based on said detected brightness of the photographic subject;

an imaging element that converts the light flux from the photographic subject into an electric signal and outputs the electric signal, the amount of light flux received from the photographic subject being controlled by said aperture value and said shutter speed, said imaging element being separate from said photometric circuit and having a plurality of photo-electric elements and a micro-lens with a plurality of corresponding micro-lens elements, said micro-lens elements facing said photo-electric elements to converge the light flux from the photographic subject to a light receiving surface of each of said photo-electric elements, wherein the electric signal output by said imaging element represents a captured image of the photographic subject;

an amplifying circuit that amplifies said electric signal outputted from said imaging element with a predefined amplification factor; and a correction circuit that corrects said aperture value, said shutter speed calculated by said exposure calculation circuit and said amplification factor to correct a change in sensitivity due to an incident angle of the light flux from the photographic subject onto each of said micro-lens elements, wherein said correction circuit corrects said aperture value, said shutter speed and said amplification factor based on said aperture value calculated by said exposure calculation circuit.

20. An imaging device, comprising:

a photometric circuit that detects a brightness of a photographic subject based on a light flux from the photographic subject that passes through a photographic lens;

an exposure calculation circuit that calculates an aperture value and a shutter speed based on said detected brightness of the photographic subject;

an imaging element that converts the light flux from the photographic subject into an electric signal and outputs the electric signal, the amount of light flux received from the photographic subject being controlled by said aperture value and said shutter speed, said imaging element being separate from said photometric circuit and having a plurality of photo-electric elements and a micro-lens with a plurality of corresponding micro-lens elements, said micro-lens elements facing said photo-electric elements to converge the light flux from the photographic subject to a light receiving surface of each of said photo-electric elements, wherein the electric signal output by said imaging element represents a captured image of the photographic subject;

an amplifying circuit that amplifies said electric signal outputted from said imaging element with a predefined amplification factor;

an exit pupil position detector that detects an exit pupil position of said photographic lens; and a correction circuit that corrects said aperture value, said shutter speed calculated by said exposure calculation circuit and said amplification factor to correct a change in sensitivity due to an incident angle of the light flux from the photographic subject onto each of said micro-lens elements, wherein said correction circuit corrects said aperture value, said shutter speed and said amplification factor based on said exit pupil position detected by said exit pupil position detector.

21. An imaging device according to claim 19, further comprising:

an exit pupil position detector that detects an exit pupil position of said photographic lens, wherein said correction circuit corrects said aperture value, said shutter speed and said amplification factor based on said aperture value calculated by said exposure calculation circuit and said exit pupil position detected by said exit pupil position detector.

22. An imaging device according to claim 19, further comprising:

a correction pattern memory that stores a plurality of correction patterns to correct said aperture value, said shutter speed and said amplification factor, said correction patterns respectively corresponding to a plurality of said micro-lenses that have different characteristics respectively, wherein said correction circuit reads out said correction pattern corresponding to said micro-lens of said imaging element from said correction pattern memory and corrects said aperture value, said shutter speed and said amplification factor based on said read out correction pattern and said aperture value calculated by said exposure calculation circuit.

23. An imaging device according to claim 20, further comprising:

a correction pattern memory that stores a plurality of correction patterns to correct said aperture value, said shutter speed and said amplification factor, said correction patterns respectively corresponding to a plurality of said micro-lenses that have different characteristics respectively, wherein said correction circuit reads out said correction pattern corresponding to said micro-lens of said imaging element from said correction pattern memory and corrects said aperture value, said shutter speed and said amplification factor based on said read out correction pattern and said exit pupil position detected by said exit pupil position detection circuit.

24. An imaging device according to claim 21, further comprising:

a correction pattern memory that stores a plurality of correction patterns to correct said aperture value, said shutter speed and said amplification factor, said correction patterns respectively corresponding to a plurality of said micro-lenses that have different characteristics respectively, wherein said correction circuit reads out said correction pattern corresponding to said micro-lens of said imaging element from said correction pattern memory and corrects said aperture value, said shutter speed and said amplification factor based on said read out correction pattern, said aperture value calculated by said exposure calculation circuit and said exit pupil position detected by said exit pupil position detector.

25. A method of forming an image, comprising the steps of:

detecting a brightness of a photographic subject with a photometric circuit based on a light flux from the photographic subject that passes through a photographic lens;

calculating an aperture value and a shutter speed based on said detected brightness of the photographic subject;

correcting said calculated aperture value based on said calculated aperture value to correct a change in sensitivity due to an incident angle of the light flux from the photographic subject onto each of a plurality of micro-lens elements of an imaging element, the amount of light flux received from the photographic subject being controlled by said aperture value and said shutter speed, said imaging element having a plurality of photo-electric elements corresponding to the plurality of micro-lens elements, said micro-lens elements facing said photo-electric elements to converge the light flux from the photographic subject to a light receiving surface of each of said photo-electric elements; and converting the light flux from the photographic subject into an electric signal and outputting the electric signal representing a captured image of the photographic subject.

26. A method of forming an image, comprising the steps of:

detecting a brightness of a photographic subject with a photometric circuit based on a light flux from the photographic subject that passes through a photographic lens;

calculating an aperture value and a shutter speed based on said detected brightness of the photographic subject;

correcting said calculated aperture value and said shutter speed based on said calculated aperture value to correct a change in sensitivity due to an incident angle of the light flux from the photographic subject onto each of a plurality of said micro-lens elements of an imaging element, the amount of light flux received from the photographic subject being controlled by said aperture value and said shutter speed, said imaging element having a plurality of photo-electric elements corresponding to the plurality of micro-lens elements, said micro-lens elements facing said photo-electric elements to converge the light flux from the photographic subject to a light receiving surface of each of said photo-electric elements; and converting the light flux from the photographic subject into an electric signal and outputting the electric signal representing a captured image of the photographic subject.

27. A method of forming an image, comprising the steps of:

detecting a brightness of a photographic subject with a photometric circuit based on a light flux from the photographic subject that passes through a photographic lens;

calculating an aperture value and a shutter speed based on said detected brightness of the photographic subject;

converting the light flux from the photographic subject into an electric signal and outputting the electric signal representing a captured image of the photographic subject;

amplifying said electric signal with a predefined amplification factor; and correcting said calculated aperture value and said amplification factor based on said calculated aperture value to correct a change in sensitivity due to an incident angle of the light flux from the photographic subject onto each of a plurality of micro-lens elements of an imaging element, the amount of light flux received from the photographic subject being controlled by said aperture value and said shutter speed, said imaging element having a plurality of photo-electric elements corresponding to the plurality of micro-lens elements, said micro-lens elements facing said photo-electric elements to converge the light flux from the photographic subject to a light receiving surface of each of said photo-electric elements.

28. A method of forming an image, comprising the steps of:

detecting a brightness of a photographic subject with a photometric circuit based on a light flux from the photographic subject that passes through a photographic lens;

calculating an aperture value and a shutter speed based on said detected brightness of the photographic subject;

converting the light flux from the photographic subject into an electric signal and outputting the electric signal representing a captured image of the photographic subject.

amplifying said electric signal with a predefined amplification factor; and correcting said calculated aperture value, said shutter speed and said amplification factor based on said calculated aperture value to correct a change in sensitivity due to an incident angle of the light flux from the photographic subject onto each of a plurality of micro-lens elements of an imaging element, the amount of light flux received from the photographic subject being controlled by said aperture value and said shutter speed, said imaging element having a plurality of photo-electric elements corresponding to the plurality of micro-lens elements, said micro-lens elements facing said photo-electric elements to converge the light flux from the photographic subject to a light receiving surface of each of said photo-electric elements.

29. A method of forming an image, comprising the steps of:

detecting a brightness of a photographic subject with a photometric circuit based on a light flux from the photographic subject that passes through a photographic lens;

calculating an aperture value and a shutter speed based on said detected brightness of the photographic subject in consideration of an output characteristic of an imaging element and based on said calculated aperture value to correct a change in sensitivity due to an incident angle of the light flux from the photographic subject onto each of a plurality of micro-lens elements of an imaging element, said imaging element being separate from said photometric circuit and having a plurality of photo-electric elements and corresponding to the plurality of micro-lens elements, said micro-lens elements facing said photo-electric elements to converge the light flux from the photographic subject to a light receiving surface of each of said photo-electric elements and said imaging element receiving an amount of light flux from the photographic subject that is controlled by said aperture value and said shutter speed; and converting the light flux from the photographic subject into an electric signal and outputting the electric signal representing a captured image of the photographic subject.

30. An imaging device according to claim 1, further comprising:

a mechanical shutter capable of mechanically shutting off the light flux from the photographic subject to said photo-electric elements, wherein a shutter speed of the mechanical shutter is determined by a driving of said mechanical shutter.

31. An imaging device, comprising:

a photometric circuit that detects a brightness of a photographic subject based on a light flux from the photographic subject that passes through a photographic lens;

an exposure calculation circuit that detects an aperture value and a shutter speed based on said detected brightness of the photographic subject;

an imaging element that converts the light flux from the photographic subject into an electric signal and outputs the electric signal, the amount of light flux received from the photographic subject being controlled by said aperture value and said shutter speed, said imaging element being separate from said photometric circuit and having a plurality of photo-electric elements and a micro-lens with a plurality of corresponding micro-lens elements, said micro-lens elements facing said photo-electric elements to converge the light flux from the photographic subject to a light receiving surface of each of said photo-electric elements, wherein the electric signal output by said imaging element represents a captured image of the photographic subject matter; and a correction circuit that corrects said aperture value calculated by said exposure calculation circuit to correct a drop in sensitivity due to a least one of a change of the aperture value and a change of an exit pupil position, wherein said correction circuit corrects said aperture value based on said aperture value calculated by said exposure calculation circuit.

32. An imaging device, comprising:

a photometric circuit that detects a brightness of a photographic subject based on a light flux from the photographic subject that passes through a photographic lens;

an exposure calculation circuit that detects an aperture value and a shutter speed based on said detected brightness of the photographic subject;

an imaging element that converts the light flux from the photographic subject into an electric signal and outputs the electric signal, the amount of light flux received from the photographic subject being controlled by said aperture value and said shutter speed, said imaging element being separate from said photometric circuit and having a plurality of photo-electric elements and a micro-lens with a plurality of corresponding micro-lens elements, said micro-lens elements facing said photo-electric elements to converge the light flux from the photographic subject to a light receiving surface of each of said photo-electric elements, wherein the electric signal output by said imaging element represents a captured image of the photographic subject;

an exit pupil position detector that detects an exit pupil position of said photographic lens; and a correction circuit that corrects said aperture value calculated by said exposure calculation circuit to correct a drop in sensitivity due to at least one of a change of the aperture value and a change of the exit pupil position, wherein said correction circuit corrects said aperture value based on said aperture value calculated by said exposure calculation circuit and said exit pupil position detected by said exit pupil position detector.

33. A method of forming an image, comprising the steps of:

detecting a brightness of a photographic subject with a photometric circuit based on a light flux from the photographic subject that passes through a photographic lens;

calculating an aperture value and a shutter speed based on said detected brightness of the photographic subject;

detecting an exit pupil position of the photographic lens;

correcting said calculated aperture value based on said detected exit pupil position to correct a change in sensitivity due to an incident angle of the light flux from the photographic subject onto each of a plurality of micro-lens elements of an imaging element, the amount of light flux received from the photographic subject being controlled by said aperture value and said shutter speed, said imaging element having a plurality of photo-electric elements corresponding to the plurality of micro-lens elements, said micro-lens elements facing said photo-electric elements to converge the light flux from the photographic subject to a light receiving surface of each of said photo-electric elements; and converting the light flux from the photographic subject into an electric signal and outputting the electric signal representing a captured image of the photographic subject.

34. A method of forming an image, comprising the steps of:

detecting a brightness of a photographic subject with a photometric circuit based on a light flux from the photographic subject that passes through a photographic lens;

calculating an aperture value and a shutter speed based on said detected brightness of the photographic subject;

detecting an exit pupil position of the photographic lens;

correcting said calculated aperture value and said shutter speed based on said detected exit pupil position to correct a change in sensitivity due to an incident angle of the light flux from the photographic subject onto each of a plurality of micro-lens elements of an imaging element, the amount of light flux received from the photographic subject being controlled by said aperture value and said shutter speed, said imaging element having a plurality of photo-electric elements corresponding to the plurality of micro-lens elements, said micro-lens elements facing said photo-electric elements to converge the light flux from the photographic subject to a light receiving surface of each of said photo-electric elements; and converting the light flux from the photographic subject into an electric signal and outputting the electric signal representing a captured image of the photographic subject.

35. A method of forming an image, comprising the steps of:

detecting a brightness of a photographic subject with a photometric circuit based on a light flux from the photographic subject that passes through a photographic lens;

calculating an aperture value and a shutter speed based on said detected brightness of the photographic subject;

converting the light flux from the photographic subject into an electric signal and outputting the electric signal representing a captured image of the photographic subject;

amplifying said electric signal with a predefined amplification factor;

detecting an exit pupil position of the photographic lens;

correcting said calculated aperture value and said amplification factor based on said detected exit pupil position to correct a change in sensitivity due to an incident angle of the light flux from the photographic subject onto each of a plurality of micro-lens elements of an imaging element, the amount of light flux received from the photographic subject being controlled by said aperture value and said shutter speed, said imaging element having a plurality of photo-electric elements corresponding to the plurality of micro-lens elements, said micro-lens elements facing said photo-electric elements to converge the light flux from the photographic subject to a light receiving surface of each of said photo-electric elements.

36. A method of forming an image, comprising the steps of:

detecting a brightness of a photographic subject with a photometric circuit based on a light flux from the photographic subject that passes through a photographic lens;

calculating an aperture value and a shutter speed based on said detected brightness of the photographic subject;

converting the light flux from the photographic subject into an electric signal and outputting the electric signal representing a captured image of the photographic subject;

amplifying said electric signal with a predefined amplification factor;

detecting an exit pupil position of the photographic lens; and correcting said calculated aperture value, said shutter speed and said amplification factor based on said detected exit pupil position to correct a change in sensitivity due to an incident angle of the light flux from the photographic subject onto each of a plurality of micro-lens elements of an imaging element, the amount of light flux received from the photographic subject being controlled by said aperture value and said shutter speed, said imaging element having a plurality of photo-electric elements corresponding to the plurality of micro-lens elements, said micro-lens elements facing said photo-electric elements to converge the light flux from the photographic subject to a light receiving surface of each of said photo-electric elements.

37. A method of forming an image, comprising the steps of:

detecting a brightness of a photographic subject with a photometric circuit based on a light flux from the photographic subject that passes through a photographic lens;

detecting an exit pupil position of the photographic lens;

calculating an aperture value and a shutter speed based on said detected brightness of the photographic subject in consideration of an output characteristic of an imaging element and based on said detected exit pupil position to correct a change in sensitivity due to an incident angle of the light flux from the photographic subject onto each of a plurality of micro-lens elements of an imaging element, said imaging element being separate from said photometric circuit and having a plurality of photo-electric elements and corresponding to the plurality of micro-lens elements, said micro-lens elements facing said photo-electric elements to converge the light flux from the photographic subject to a light receiving surface of each of said photo-electric elements and said imaging element receiving an amount of light flux from the photograph subject that is controlled by said aperture value and said shutter speed;

converting the light flux from the photographic subject into an electric signal and outputting the electric signal representing a captured image of the photographic subject.

* * * * *